United States Patent
Shafer et al.

(10) Patent No.: US 10,274,386 B2
(45) Date of Patent: Apr. 30, 2019

(54) RETROREFLECTIVE MULTI-AXIS FORCE TORQUE SENSOR

(71) Applicant: X Development LLC, Mountain View, CA (US)

(72) Inventors: Alex Shafer, Mountain View, CA (US); Adam Reich, Oakland, CA (US); Emily Cooper, San Francisco, CA (US)

(73) Assignee: X Development LLC, Mountain View, CA (US)

( * ) Notice: Subject to any disclaimer, the term of this patent is extended or adjusted under 35 U.S.C. 154(b) by 188 days.

(21) Appl. No.: 15/187,445

(22) Filed: Jun. 20, 2016

(65) Prior Publication Data

US 2017/0363464 A1 Dec. 21, 2017

(51) Int. Cl.
*G01L 5/16* (2006.01)
*G01J 1/42* (2006.01)
(Continued)

(52) U.S. Cl.
CPC ............... *G01L 5/16* (2013.01); *G01B 11/14* (2013.01); *G01J 1/04* (2013.01); *G01J 1/4228* (2013.01); *G01L 5/166* (2013.01)

(58) Field of Classification Search
CPC .. G01J 1/4228; G01J 1/04; G01J 1/044; G01J 1/24; G01B 11/14; G01B 11/16;
(Continued)

(56) References Cited

U.S. PATENT DOCUMENTS 4,704,909 A 11/1987 Grahn et al.
5,818,037 A * 10/1998 Redford .................. G01D 5/30
250/229
(Continued)

FOREIGN PATENT DOCUMENTS

EP 2195628 6/2010

OTHER PUBLICATIONS

Written Opinion of the International Searching Authority for related PCT/US2017/036536 application, dated Sep. 13, 2017, 12 pages.
(Continued)

*Primary Examiner* — Que Tan Le
*Assistant Examiner* — Jennifer D Bennett
(74) *Attorney, Agent, or Firm* — McDonnell Boehnen Hulbert & Berghoff LLP

(57) ABSTRACT

The present application discloses implementations that relate to devices and techniques for sensing position, force, and torque. Devices described herein may include a light emitter, photodetectors, and a curved reflector. The light emitter may project light onto the curved reflector, which may reflect portions of that projected light onto one or more of the photodetectors. Based on the illuminances measured at the photodetectors, the position of the curved reflector may be determined. In some implementations, the curved reflector and the light emitter may be elastically coupled via one or more spring elements; in these implementations, a force vector representing a magnitude and direction of a force applied against the curved reflector may be determined based on the position of the curved reflector.

20 Claims, 13 Drawing Sheets

(51) Int. Cl.
*G01J 1/04* (2006.01)
*G01B 11/14* (2006.01)

(58) Field of Classification Search
CPC ......... G01L 1/24; G01L 5/166; G01L 5/0047; G01L 5/16; G01L 5/0028
See application file for complete search history.

(56) References Cited

U.S. PATENT DOCUMENTS

| | | | |
|---|---|---|---|
| 7,701,202 B2 | 4/2010 | Torres-Jara | |
| 8,094,121 B2* | 1/2012 | Obermeyer | G05G 9/047 345/156 |
| 8,101,904 B2 | 1/2012 | Torres-Jara | |
| 8,965,577 B2 | 2/2015 | Arimitsu | |
| 2007/0181789 A1* | 8/2007 | Abrate | G01L 1/242 250/227.16 |
| 2010/0113980 A1* | 5/2010 | Herr | A61F 2/60 600/587 |
| 2010/0253650 A1* | 10/2010 | Dietzel | G01L 1/241 345/175 |
| 2010/0312394 A1* | 12/2010 | Arimitsu | G01L 5/166 700/260 |
| 2013/0265233 A1 | 10/2013 | Obermeyer et al. | |
| 2015/0177082 A1 | 6/2015 | Sawada et al. | |
| 2015/0276518 A1* | 10/2015 | Nagura | G01B 9/02028 250/227.19 |

OTHER PUBLICATIONS

A soft touch: Compliant Tactile Sensors for Sensitive Manipulation. E. Torres-Jara, I. Vasilescu, and R. Coral. Computer Science and Artificial Intelligence Laboratory Technical Report MIT-CSAIL-TR-2006-14. Mar. 2006.

"Development of a Low Cost 3D Optical Compliant Tactile Force Sensor." A Tar, G. Cserey. IEEE/ASME AIM2011. 2011.

Capacitive F/T Transducer Model 200, Low-Cost Six Axis Force/Torque Sensor Data Sheet, ATI Industrial Automation, Aug. 2015 http://www.ati-ia.com/Library/documents/Capacitive%20FT200.pdf.

HEX-70-XG 6-Axis F/T Sensor Data Sheet, OptoForce, Jun. 28, 2016, http://pdf.directindustry.com/pdf/optoforce-ltd/hex-7-0-x-g/125451-667819.html.

6-Axis Force / Moment Sensor FT, Schunk, Apr. 21, 2015 https://us.schunk.com/fileadmin/pim/docs/IM0018179.PDF.

FT 300 Force Torque Sensor, RobotIQ, Jun. 14, 2016, http://robotiq.com/wp-content/uploads/2016/01/specsheet-FT300-Final-web.pdf.

Schunk FTC-050 Force Sensor Data sheet, available at least as of Dec. 9, 2008.

HEX-58-RE-400N 6-Axis Force Sensor Data Sheet, OptoForce, Apr. 14, 2016 http://optoforce.com/wp-content/uploads/2014/03/HEX-58-RE-400N-DATASHEET-1.41.pdf.

HEX-70-CE-2000N 6-Axis F/T Sensor Data Sheet, OptoForce, Apr. 14, 2016 http://optoforce.com/wp-content/uploads/2014/03/HEX-70-CE-2000N-DATASHEET-1.41.pdf.

HEX-70-CG-1000N 6-Axis F/T Sensor Data Sheet, OptoForce, Apr. 14, 2016 http://optoforce.com/wp-content/uploads/2014/03/HEX-70-CG-1000N-DATASHEET-1.41.pdf.

HEX-70-CH-1-4000N 6-Axis F/T Sensor Data Sheet, OptoForce, Apr. 14, 2016 http://optoforce.com/wp-content/uploads/2016/09/HEX-70-CH-4000N-DATASHEET-1.5.pdf.

HEX-70-XE 6-Axis F/T Sensor Data Sheet, OptoForce, Jun. 1, 2016, http://optoforce.com/wp-content/uploads/2014/03/HEX-70-XE-DATASHEET.pdf.

FT 150 Force Torque Sensor, RobotIQ, Sep. 10, 2014, http://robotiq.com/wp-content/uploads/2014/09/Robotiq-Force-Torque-Sensor-FT-150-Specifications.pdf.

* cited by examiner

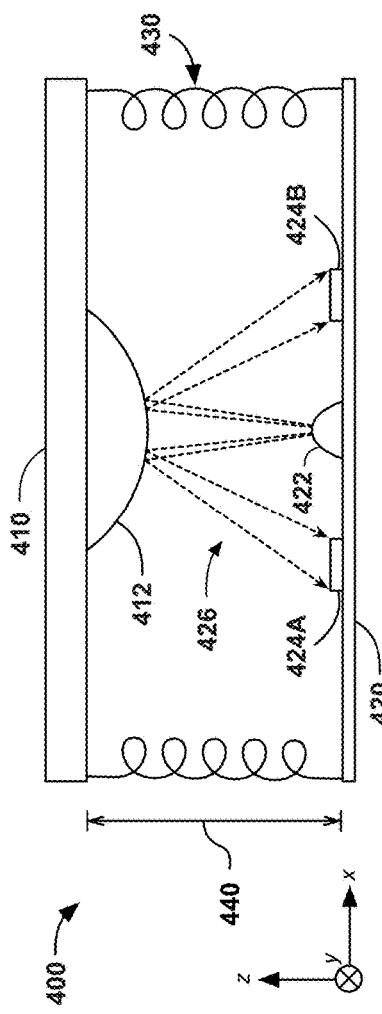
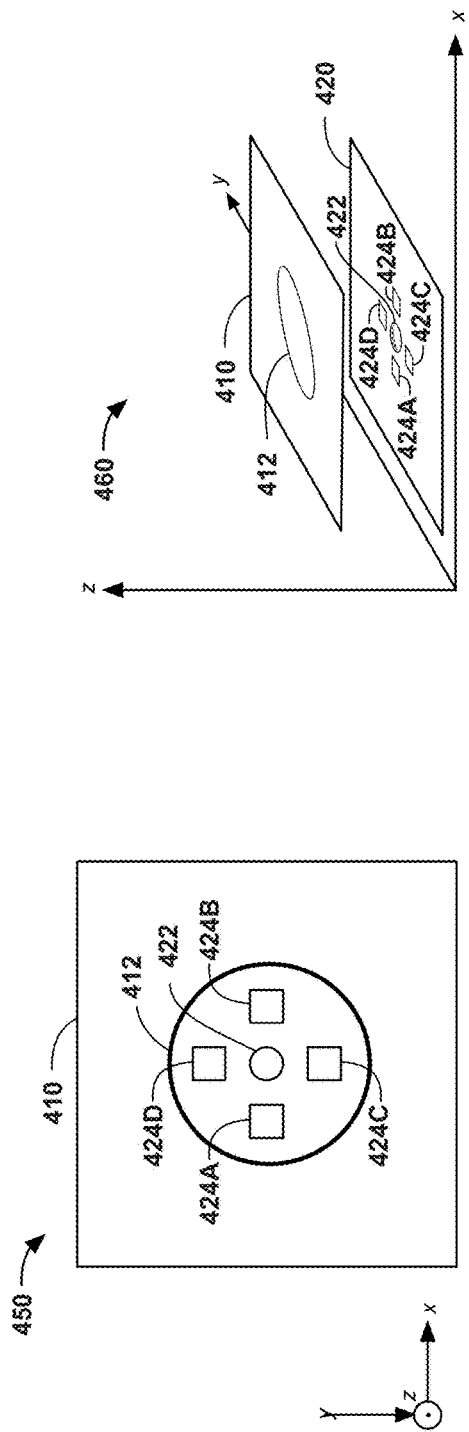
Figure 4A
Figure 4B
Figure 4C

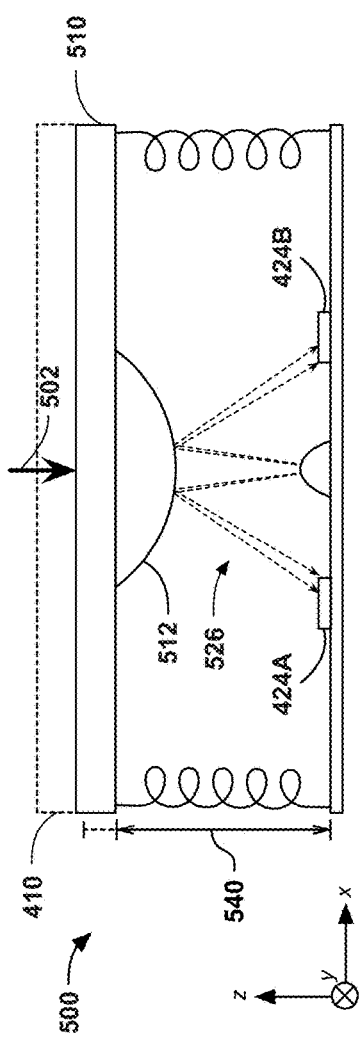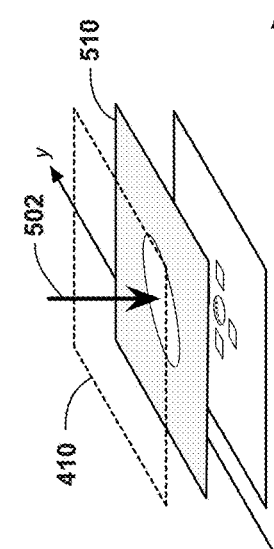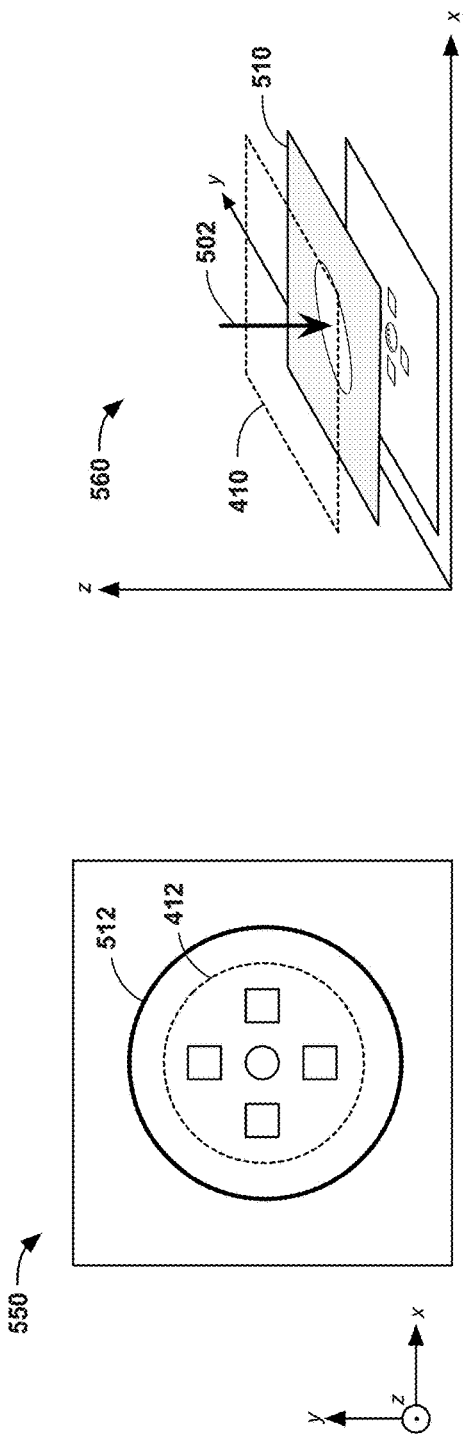
Figure 5A
Figure 5B
Figure 5C

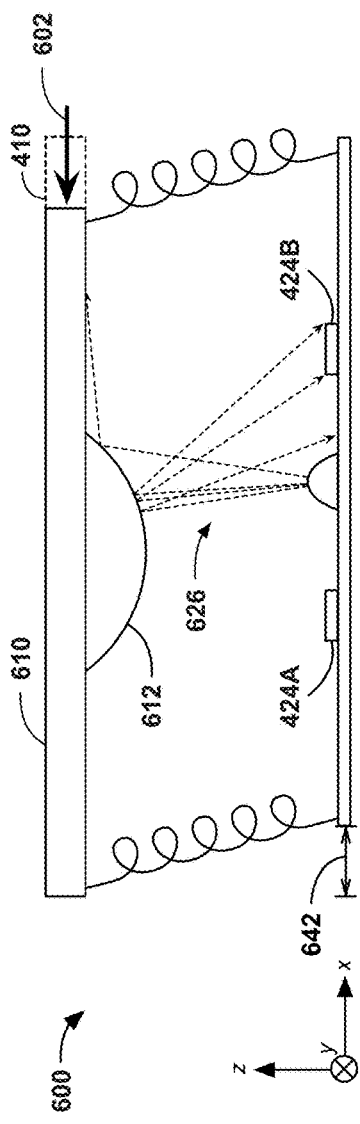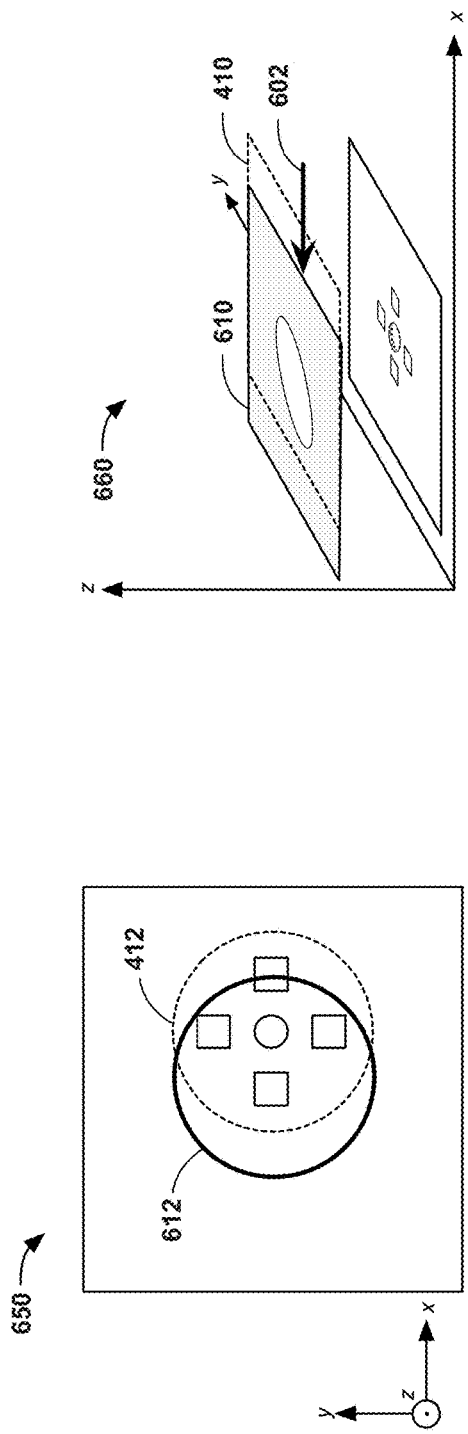

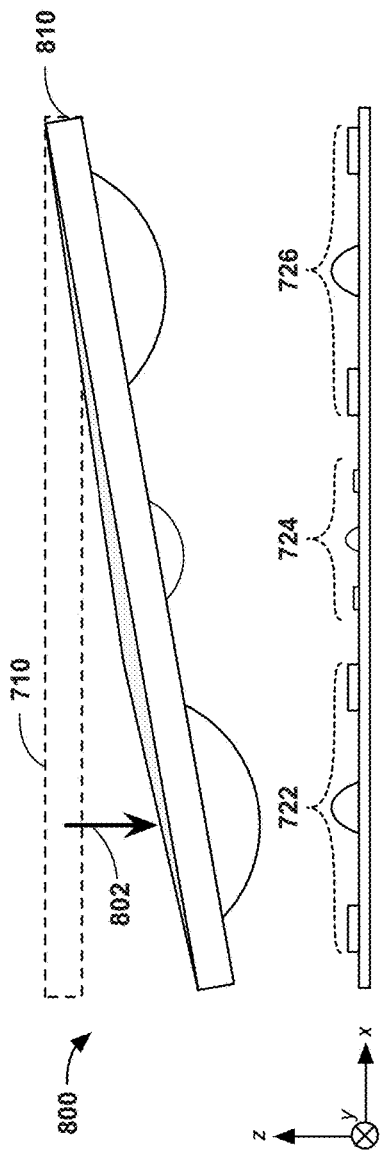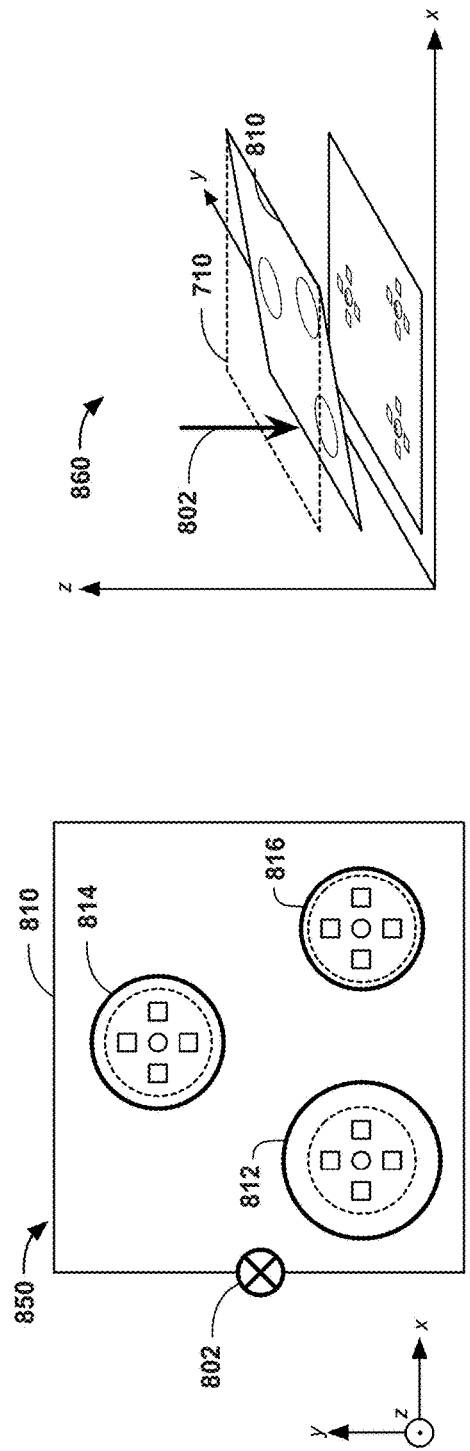

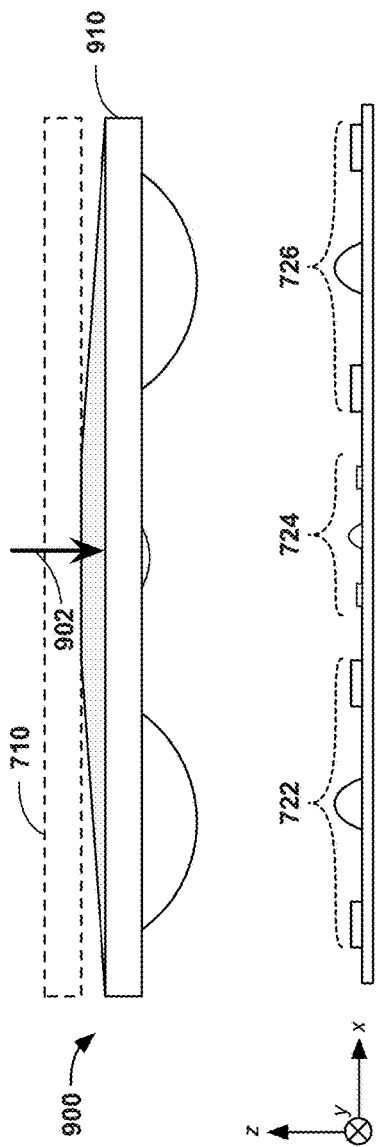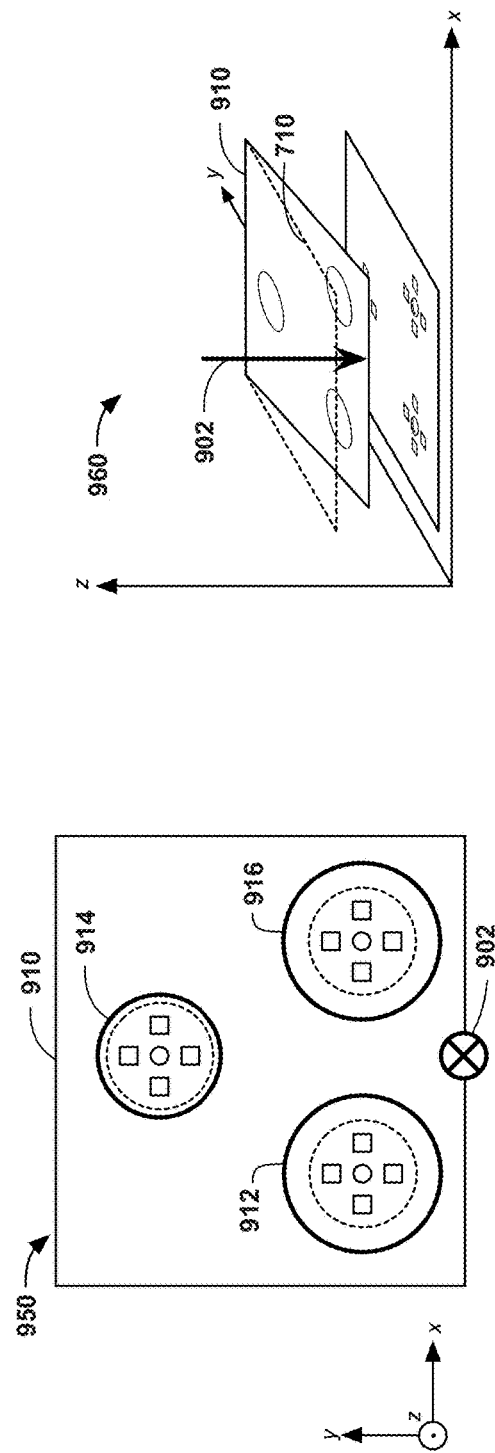
Figure 9A
Figure 9B
Figure 9C

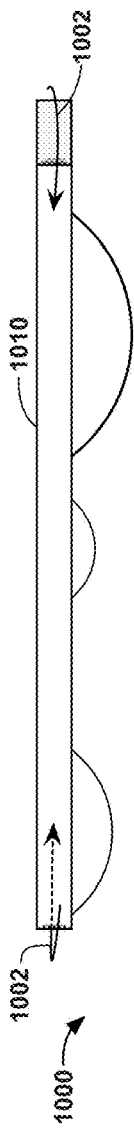
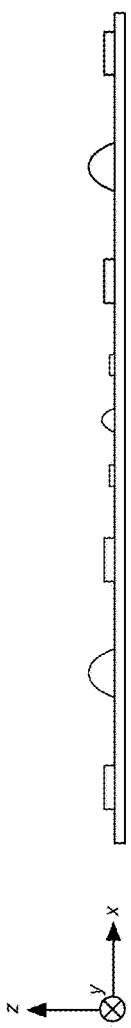
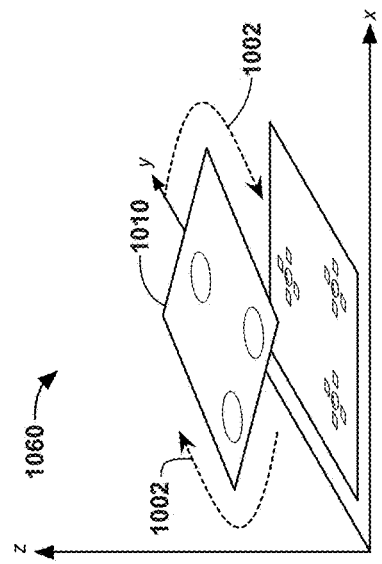
Figure 10A
Figure 10B
Figure 10C

RETROREFLECTIVE MULTI-AXIS FORCE TORQUE SENSOR

BACKGROUND

As technology advances, various types of robotic devices are being created for performing a variety of functions that may assist users. Robotic devices may be used for applications involving material handling, transportation, welding, assembly, and dispensing, among others. Over time, the manner in which these robotic systems operate is becoming more intelligent, efficient, and intuitive. As robotic systems become increasingly prevalent in numerous aspects of modern life, it is desirable for robotic systems to be efficient. Therefore, a demand for efficient robotic systems has helped open up a field of innovation in actuators, movement, sensing techniques, as well as component design and assembly.

SUMMARY

The present application discloses implementations that relate to devices and techniques for sensing position, force, and torque. Devices described herein may include a light emitter, photodetectors, and a curved reflector. The light emitter may project light onto the curved reflector, which may reflect portions of that projected light onto one or more of the photodetectors. Based on the illuminances measured at the photodetectors, the position of the curved reflector may be determined. In some implementations, the curved reflector and the light emitter may be elastically coupled via one or more spring elements; in these implementations, a force vector representing a magnitude and direction of a force applied against the curved reflector may be determined based on the position of the curved reflector.

In another example, the present application describes a device. The device includes a rigid structure, a curved reflector, three or more photodetectors, a light emitter, and at least one processor. The curved reflector is fixed to a surface of the rigid structure. The three or more photodetectors are each operable to measure an illuminance of light incident on the photodetector. The light emitter is operable to project light toward the curved reflector. The curved reflector reflects respective portions of the projected light onto the three or more photodetectors. The light emitter and the three or more photodetectors are fixed with respect to each other. The rigid structure is movable in one or more degrees of freedom with respect to the light emitter and the three or more photodetectors. The at least one processor configured to perform a set of operations. The operations include measuring, by each photodetector of the three or more photodetectors, an illuminance of the respective portion of projected light incident on the photodetector. The operations also include determining, based on the measured illuminances, a displacement of the rigid body in one or more degrees of freedom with respect to a reference position of the rigid body. The operations further include providing an output signal indicative of the displacement.

In another example, the present application describes a device. The device includes a first rigid structure, a curved reflector, a second rigid structure, a spring element, three or more photodetectors, a light emitter, and at least one processor. The curved reflector is fixed to a surface of the first rigid structure. The first rigid structure is movable in one or more degrees of freedom with respect to the second rigid structure. The first rigid structure is displaced from a reference position when a force is applied against the first rigid structure. The spring element elastically couples the first rigid structure to the second rigid structure. The three or more photodetectors are each operable to measure an illuminance of light incident on the photodetector. The three or more photodetectors are fixed to a surface of the second rigid structure. The light emitter operable to project light toward the curved reflector. The curved reflector reflects respective portions of the projected light onto the three or more photodetectors, wherein the light emitter is fixed to the surface of the second rigid structure. The at least one processor configured to perform a set of operations. The operations include measuring, by each photodetector of the three or more photodetectors, an illuminance of the respective portion of projected light incident on the photodetector. The operations also include determining, based on the measured illuminances, a force vector indicative of a magnitude of the force and a direction of the force in one or more degrees of freedom. The operations further include providing an output signal indicative of the force vector.

In a further example, the present application describes a method. The method involves causing a light emitter to project light toward a curved reflector fixed to a surface of the rigid structure. The method also involves measuring, by three or more photodetectors, three or more illuminances of light incident on the respective three or more photodetectors. Each illuminance represents an intensity of a portion of the projected light that reflects off the curved reflector and is incident on a respective photodetector. The method further involves determining, based on the three or more illuminances, a displacement that represents a change in position of the curved reflector from a reference position in one or more degrees of freedom. Additionally, the method involves providing an output indicative of the displacement.

In yet another example, the present application describes a system. The system includes a means for causing a light emitter to project light toward a curved reflector fixed to a surface of the rigid structure. The system also includes a means for measuring, by three or more photodetectors, three or more illuminances of light incident on the respective three or more photodetectors. Each illuminance represents an intensity of a portion of the projected light that reflects off the curved reflector and is incident on a respective photodetector. The system further includes a means for determining, based on the three or more illuminances, a displacement that represents a change in position of the curved reflector from a reference position in one or more degrees of freedom. Additionally, the system includes a means for providing an output indicative of the displacement.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE FIGURES

FIG. 4A illustrates a side view of a force sensor at rest, according to an example implementation.

FIG. 4B illustrates a top-down view of a force sensor at rest, according to an example implementation.

FIG. 4C illustrates a perspective view of a force sensor at rest, according to an example implementation.

FIG. 5A illustrates a side view of a force sensor subjected to a downward force, according to an example implementation.

FIG. 5B illustrates a top-down view of a force sensor subjected to a downward force, according to an example implementation.

FIG. 5C illustrates a perspective view of a force sensor subjected to a downward force, according to an example implementation.

FIG. 6A illustrates a side view of a force sensor subjected to a lateral force, according to an example implementation.

FIG. 6B illustrates a top-down view of a force sensor subjected to a lateral force, according to an example implementation.

FIG. 6C illustrates a perspective view of a force sensor subjected to a lateral force, according to an example implementation.

FIG. 8A illustrates a side view of force and torque sensor subjected to a downward force, according to an example implementation.

FIG. 8B illustrates a top-down view of a force and torque sensor subjected to a downward force, according to an example implementation.

FIG. 8C illustrates a perspective view of a force and torque sensor subjected to a downward force, according to an example implementation.

FIG. 9A illustrates a side view of a force and torque sensor subjected to a downward force, according to an example implementation.

FIG. 9B illustrates a top-down view of a force and torque sensor subjected to a downward force, according to an example implementation.

FIG. 9C illustrates a perspective view of a force and torque sensor subjected to a downward force, according to an example implementation.

FIG. 10A illustrates a side view of a force and torque sensor subjected to a torque, according to an example implementation.

FIG. 10B illustrates a top-down view of a force and torque sensor subjected to a torque, according to an example implementation.

FIG. 10C illustrates a perspective view of a force and torque sensor subjected to a torque, according to an example implementation.

DETAILED DESCRIPTION

Figure 1:
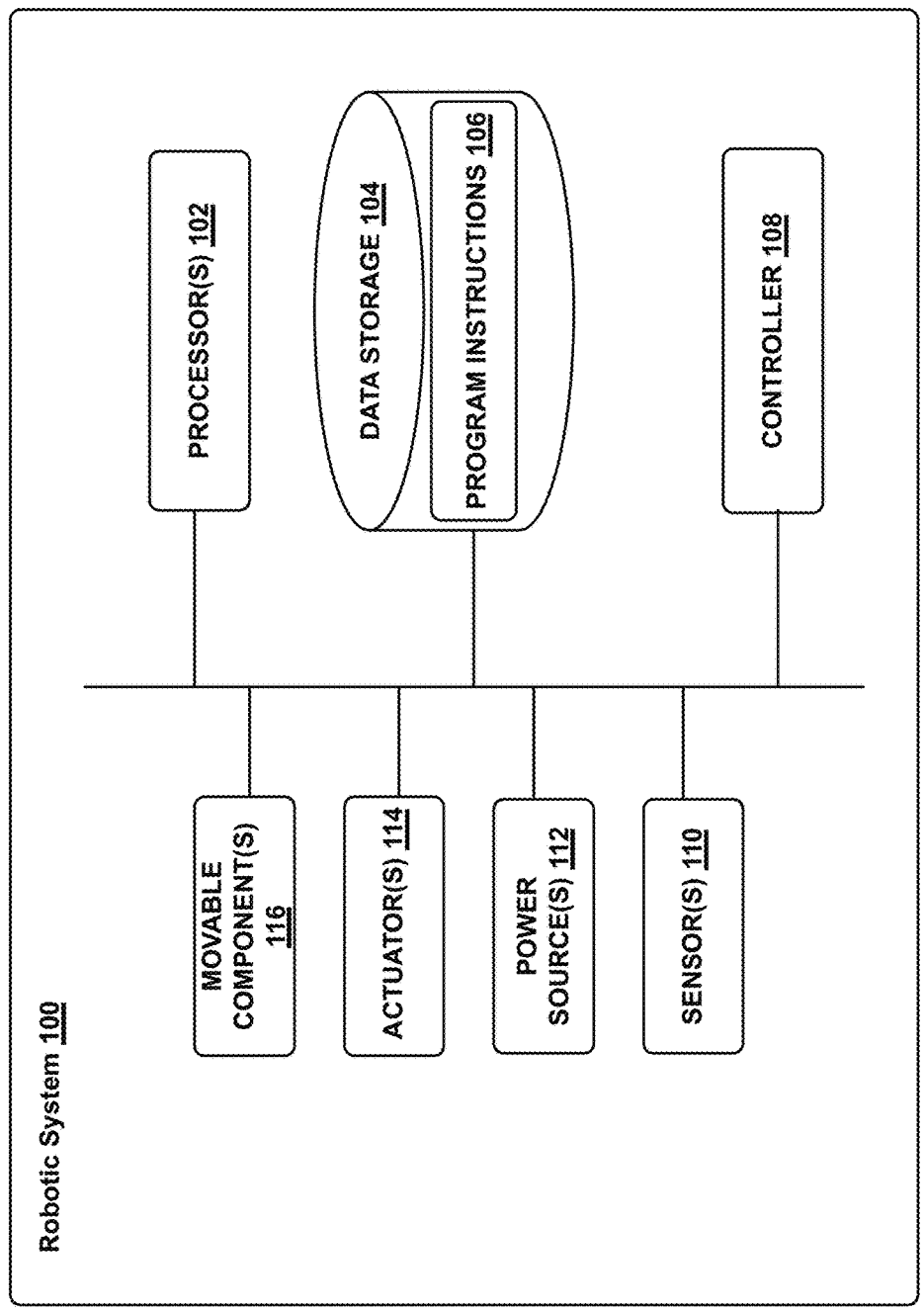
FIG. 1 illustrates an example configuration of a robotic system, according to an example implementation.

The following detailed description describes various features and operations of the disclosed systems and methods with reference to the accompanying figures. The illustrative system and method embodiments described herein are not meant to be limiting. It may be readily understood that certain aspects of the disclosed systems and methods can be arranged and combined in a wide variety of different configurations, all of which are contemplated herein.

I. OVERVIEW

The present application discloses implementations that relate to devices and techniques for measuring position, force, and/or torque. One type of force and torque sensor may project light onto a reflective inner surface of a viscoelastic dome, which may deform when subjected to an external force. The deformation of the viscoelastic dome may alter the reflection pattern of light projected onto the reflective inner surface. By sensing characteristics of this deformity, the sensor may estimate the force applied against the viscoelastic dome. However, the accuracy of such deformity-based force sensing relies upon the performance of the viscoelastic material that undergoes stresses caused by the application of a force against that surface.

Viscoelastic materials are susceptible to hysteresis and creep. Thus, a time delay may exist between the application of force against the viscoelastic material and the resulting deformation caused by that force. Additionally, viscoelastic materials may permanently deform over time, causing deformation-based force sensors to become increasingly inaccurate as they are used.

Implementations disclosed herein involve force and torque sensing based on translation of a reflective surface, rather than on viscoelastic deformation. In some instances, the reflective surface may be coupled to an elastic or spring element (e.g., a non-viscoelastic flexure) that removes or significantly allays the hysteresis and creep limitations of viscoelastic materials. Translation-based force and torque sensors with non-viscoelastic flexures may allow for more rapid force sensing and may better maintain reliability and accuracy through continued use.

An example sensing device includes a light emitter, a curved reflector, and three or more photodetectors. The light emitter may project light toward the curved reflector, which may then reflect a portion of that reflected light toward the three or more photodetectors. Each photodetector may measure the illuminance of incident light on that photodetector. Based on the measured illuminances, the position of the curved reflector and/or the vector of a force applied against the curved reflector may be determined.

As described herein, "illuminance" may refer to a total luminous flux incident on a surface. A photodetector may include a photosensitive region, which converts the illuminance of light incident on that photosensitive region into a proportionate current, voltage, capacitance, or charge. A light emitter—such as a light-emitting diode, a laser, or other light source—may emit a total amount of illuminance, which may be referred to the "illuminance exitance." An amount of the illuminance exitance may be directed toward and incident on the curved reflector. The curved reflector may reflect portions of that incident light toward the photosensitive regions of one or more photodetectors.

The illuminance measured by each photodetector depends upon the location of the curved reflector. As the curved reflector moves relative to the light emitter, the distribution of light (also referred to herein as the "illuminance distribution") reflected back toward the photodetectors changes. The photodetectors may capture illuminance values at multiple locations relative to the light emitter, from which the illuminance distribution may be inferred or estimated.

The curved reflector may be mounted on or otherwise coupled to a surface of a movable structure, such as a platform, board, plate, or other object. When a force is exerted against the movable structure, it may translate in one or more degrees of freedom, causing the curved reflector to displace from a rest position. This translation may change the illuminance distribution measured by the photodetectors. Based on this illuminance distribution (and/or change in illuminance distribution), the position of the curved reflector may be determined. In some instances, a force vector—representing the magnitude and direction of the force applied against the movable structure—may be determined based on the position of the curved reflector. The movable structure may be composed of a non-viscoelastic material, and may also be referred to herein as a "rigid structure," and may be composed of a non-viscoelastic material. An inelastic material may be any material—such as plastics, metals, and other non-viscoelastic materials—that is rigid and generally retains its shape when subjected to external forces (at least within a range of force magnitudes below a threshold amount of force).

In some implementations a "curved" reflector may be a multifaceted reflective object, whose facets collectively form a convex or concave geometry. As one example, a curved reflector may be similar to a portion of a disco ball, where the facets roughly form the shape of a sphere. Other polygonal geometries may also be used to reflect and distribute light in a similar manner as a spherical, ovoid, globate, or globular geometry. It should be understood that the geometry may vary among implementations and/or due to manufacturing limitations.

Some sensing devices may include one or more spring elements (e.g., a flexure) coupled to the movable structure. In these implementations, the rest position of the curved reflector (which may also be referred to herein as a "reference position") may be the position of the curved reflector when the spring elements are at equilibrium. When a force is applied against the movable structure, the spring elements may expand and/or contract proportionate to the magnitude and direction of that force. Thus, the extent to which the curved reflector is moved may correspond to a direction and magnitude of force, based on properties of the spring elements and the particular arrangement of the light emitter, photodetectors, and curved reflector.

In some implementations, a model may correlate illuminance distributions with displacement vectors of the curved reflector. The model may incorporate the dimensions and arrangement of the light emitter, photodetectors, curved reflector, and movable surface. The model may also include information about spring elements coupled to the movable surface (e.g., the spring constants of those elements). Such a model may enable a computing device to calculate or estimate the position of the curved reflector based on the measured illuminances at the photodetectors. The model may also permit a computing device to determine the vector of the force applied against the movable structure based on the estimated position of the curved reflector and the known properties of the spring elements.

In some implementations, a sensing device such as those described herein may undergo a series of controlled tests in order to model the behavior of that particular sensing device. These tests may be referred to herein as "calibration." During calibration, a particular sensing device may be subjected to a known force (with a known direction and known magnitude), and the illuminance values measured by the photodetectors may be recorded. This step of correlating sets of illuminance values with known forces may be repeated for known forces of various magnitudes and directions.

Such a calibration process may produce calibration data, which may serve as a basis for determining the position of the curved reflector, the vector of a force applied against the movable structure, and/or the vector of a torque applied against the movable structure. For example, a computing device may employ a linear regression (or other types of regression) analysis in order to approximate or estimate the force vector based on measured illuminance values and the calibration data set. As another example, the calibration data may be used to generate transformation matrices that allow a computing device to determine force and/or torque vectors based on displacement vectors of the curved reflector.

In some implementations, a regression analysis (e.g., using a least squares approach) involves determining a transformation matrix based on the calibration data. A transformation matrix may be used to convert illuminance values into position or displacement values, force values, or torque values. Once the transformation matrix or matrices have been determined, they may be stored in memory and used during the sensor's operation; in other words, determining position, force, and/or torque during operation may involve applying one or more predetermined transformation matrices.

Determining transformation matrices using linear regression is one example technique for modeling the force and torque sensor. In other embodiments, statistical models, machine learning tools, neural networks, and other non-linear models may be used to model the relationship between illuminance values (e.g., based on photodetector voltages) and force or torque values in a force and torque sensor. Data collected during calibration may be used to train such machine learning models. For example, calibration may involve capturing illuminance values and labeling them with known force or torque values. The labeled illuminance values may be provided to a machine learning tool to develop a model of the force and torque sensor. Once determined, the model may be stored and used during the operation of the sensor to estimate the values of the force and/or torque applied against the sensor.

Sensing devices described herein may include computing devices with processors and memory devices. The memory devices may store therein models and/or calibration data, along with program instructions and other information. The processors may receive illuminance measurements from the photodetectors and apply them to models and/or other computational or mathematical processes based on the calibration data in order to determine or estimate the vector of a force applied against the movable surface.

In some implementations, a sensing device may include multiple curved reflectors coupled to the movable structure, multiple light emitters, and multiple clusters of photodetectors. At rest (e.g., when the movable structure is not subjected to a force), each curved reflector may correspond to a respective light emitter and a respective cluster of photodetectors. However, when the movable structure is subjected to a force, the movable structure may translate in one or more spatial dimensions (e.g., along an x-, y-, and z-axis), and may also rotate in one or more angular dimensions (e.g., roll, pitch, and yaw). If the movable structure translates, but does not rotate, the relative position of each curved reflector with respect to its respective light emitter may be the same for each curved reflector. However, if the movable structure rotates (e.g., rolls, pitches, and/or yaws), the relative position of each curved reflector with respect to its respective light emitter may be different for each curved reflector. Thus, angular displacements of the movable structure may produce different illuminance distributions for each cluster of photodetectors.

In such implementations, a set of illuminance distributions (e.g., a distribution for each cluster of photodetectors) may correspond to a torque vector, representing the magnitude and direction of a torque resulting from force(s) applied against the movable structure. For example, if a downwards force is applied at an edge of the movable structure, the movable structure may roll or pitch. If a lateral force (or a force with a lateral component) is applied to the movable structure, the movable structure may yaw. A model—either based on the known configuration of the sensing device or based on calibration data—may correlate sets of illuminance distributions (or sets of illuminance measurements) with torque vectors. A calibration process for sensing devices with multiple curved reflectors, light emitters, and clusters of photodetectors may subject the sensing device to known torques and capture the illuminance measurements from the clusters of photodetectors. In this implementations, a sensing device may measure force and/or torque in six degrees of freedom (DOFs).

The force and torque sensing devices described herein may be used in a variety of applications. For example, they may be incorporated within a robotic finger or other robotic appendage to improve its dexterity and sensory capabilities. A robot may be controlled or instructed to perform a delicate task that requires it to use its fingers to grip an object. High accuracy and rapid-sensing force and torque sensors of the present application may be used to enable a robot to detect gripping forces accurately and permit the robot to respond quickly to changes in those gripping forces. Using this information, the robot may be able to perform precise maneuvers to accomplish a desired task.

II. EXAMPLE ROBOTIC SYSTEMS

FIG. 1 illustrates an example configuration of a robotic system that may be used in connection with the implementations described herein. The robotic system 100 may be a robotic arm, a different type of robotic manipulator, or it may have a number of different forms. Additionally, the robotic system 100 may also be referred to as a robotic device, robotic manipulator, or robot, among others.

The robotic system 100 is shown to include processor(s) 102, data storage 104, program instructions 106, controller 108, sensor(s) 110, power source(s) 112, actuator(s) 114, and movable component(s) 116. Note that the robotic system 100 is shown for illustration purposes only as robotic system 100 may include additional components and/or have one or more components removed without departing from the scope of the invention. Further, note that the various components of robotic system 100 may be connected in any manner.

Processor(s) 102 may be a general-purpose processor or a special purpose processor (e.g., digital signal processors, application specific integrated circuits, etc.). The processor(s) 102 can be configured to execute computer-readable program instructions 106 that are stored in the data storage 104 and are executable to provide the functionality of the robotic system 100 described herein. For instance, the program instructions 106 may be executable to provide functionality of controller 108, where the controller 108 may be configured to instruct an actuator 114 to cause movement of one or more movable component(s) 116.

The data storage 104 may include or take the form of one or more computer-readable storage media that can be read or accessed by processor(s) 102. The one or more computer-readable storage media can include volatile and/or non-volatile storage components, such as optical, magnetic, organic or other memory or disc storage, which can be integrated in whole or in part with processor(s) 102. In some embodiments, the data storage 104 can be implemented using a single physical device (e.g., one optical, magnetic, organic or other memory or disc storage unit), while in other embodiments, the data storage 104 can be implemented using two or more physical devices. Further, in addition to the computer-readable program instructions 106, the data storage 104 may include additional data such as diagnostic data, among other possibilities.

The robotic system 100 may include one or more sensor(s) 110 such as force sensors, proximity sensors, motion sensors, load sensors, position sensors, touch sensors, depth sensors, ultrasonic range sensors, and infrared sensors, among other possibilities. The sensor(s) 110 may provide sensor data to the processor(s) 102 to allow for appropriate interaction of the robotic system 100 with the environment. Additionally, the sensor data may be used in evaluation of various factors for providing feedback as further discussed below. Further, the robotic system 100 may also include one or more power source(s) 112 configured to supply power to various components of the robotic system 100. Any type of power source may be used such as, for example, a gasoline engine or a battery.

The robotic system 100 may also include one or more actuator(s) 114. An actuator is a mechanism that may be used to introduce mechanical motion. In particular, an actuator may be configured to convert stored energy into movement of one or more components. Various mechanisms may be used to power an actuator. For instance, actuators may be powered by chemicals, compressed air, or electricity, among other possibilities. In some cases, an actuator may be a rotary actuator that may be used in systems involving rotational forms of motion (e.g., a joint in the robotic system 100). In other cases, an actuator may be a linear actuator that may be used in systems involving straight line motion.

In either case, actuator(s) 114 may cause movement of various movable component(s) 116 of the robotic system 100. The moveable component(s) 116 may include appendages such as robotic arms, legs, and/or hands, among others. The moveable component(s) 116 may also include a movable base, wheels, and/or end effectors, among others.

In some implementations, a computing system (not shown) may be coupled to the robotic system 100 and may be configured to receive input from a user, such as via a graphical user interface. This computing system may be incorporated within the robotic system 100 or may be an external computing system that is capable of (wired or wireless) communication with the robotic system 100. As such, the robotic system 100 may receive information and instructions, such as based on user-input at the graphical user interface and/or based on user-input received via press of buttons (or tactile input) on the robotic system 100, among other possibilities.

Figure 2:
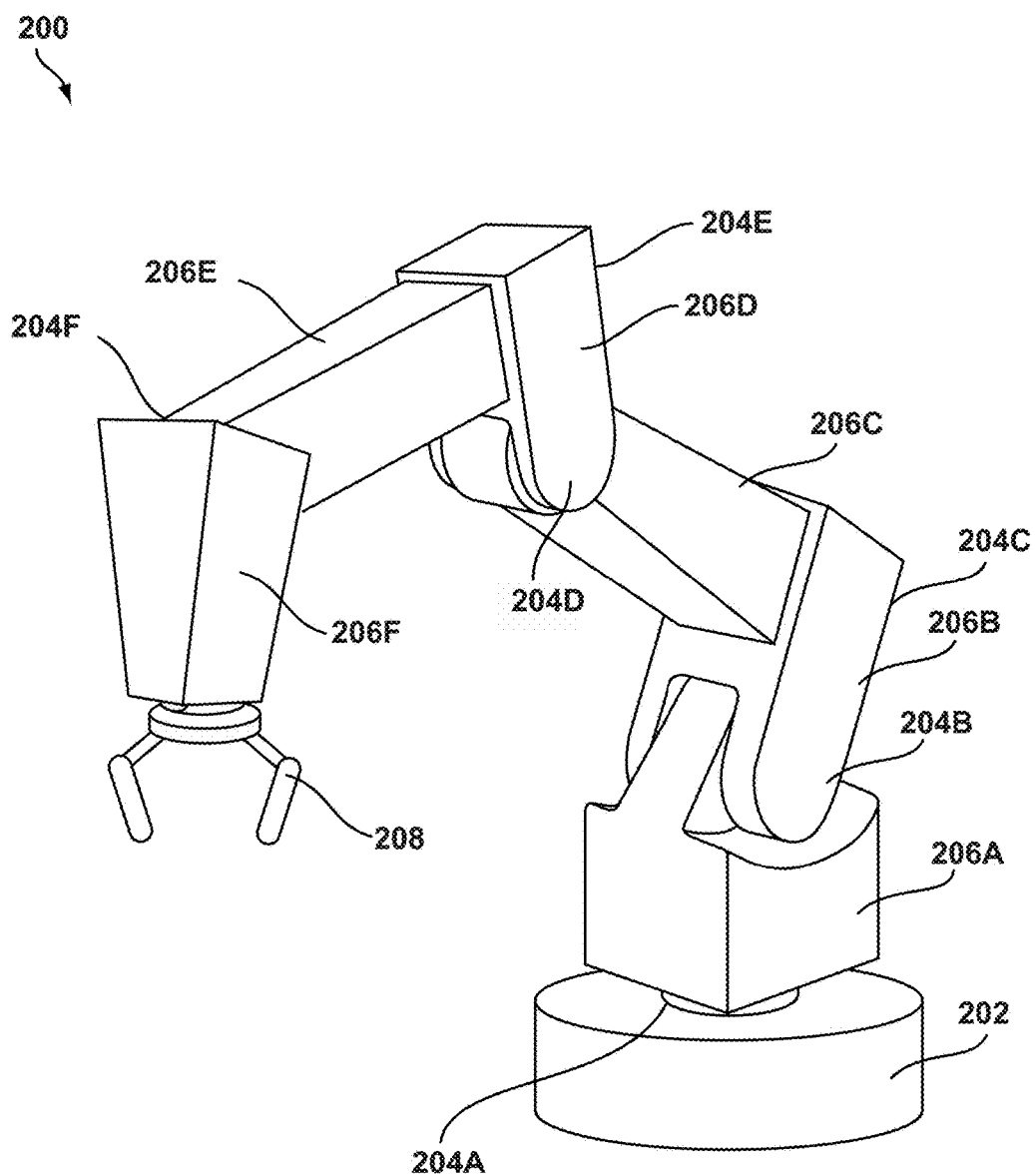
FIG. 2 illustrates an example robotic arm, according to an example implementation.

A robotic system 100 may take on various forms. To illustrate, FIG. 2 shows an example robotic arm 200. As shown, the robotic arm 200 includes a base 202, which may be a stationary base or may be a movable base. In the case of a movable base, the base 202 may be considered as one of the movable component(s) 116 and may include wheels (not shown), powered by one or more of the actuator(s) 114, which allow for mobility of the entire robotic arm 200.

Additionally, the robotic arm 200 includes joints 204A-204F each coupled to one or more of the actuator(s) 114. The actuators in joints 204A-204F may operate to cause movement of various movable component(s) 116 such as appendages 206A-206F and/or end effector 208. For example, the actuator in joint 204F may cause movement of appendage 206F and end effector 208 (i.e., since end effector 208 is coupled to appendage 206F). Further, end effector 208 may take on various forms and may include various parts. In one example, end effector 208 may take the form of a gripper such as a finger gripper as shown here or a different type of gripper such as a suction gripper. In another example, end effector 208 may take the form of a tool such as a drill or a brush. In yet another example, the end effector may include sensors such as force sensors, location sensors, and/or proximity sensors. Other examples may also be possible.

In an example implementation, a robotic system 100, such as robotic arm 200, may be capable of operating in a teach mode. In particular, teach mode may be an operating mode of the robotic arm 200 that allows a user to physically interact with and guide the robotic arm 200 towards carrying out and recording various movements. In a teaching mode, an external force is applied (e.g., by the user) to the robotic system 100 based on a teaching input that is intended to teach the robotic system regarding how to carry out a specific task. The robotic arm 200 may thus obtain data regarding how to carry out the specific task based on instructions and guidance from the user. Such data may relate to a plurality of configurations of the movable component(s) 116, joint position data, velocity data, acceleration data, torque data, force data, and power data, among other possibilities.

For example, during teach mode the user may grasp onto any part of the robotic arm 200 and provide an external force by physically moving the robotic arm 200. In particular, the user may guide the robotic arm 200 towards grasping onto an object and then moving the object from a first location to a second location. As the user guides the robotic arm 200 during teach mode, the system may obtain and record data related to the movement such that the robotic arm 200 may be configured to independently carry out the task at a future time during independent operation (e.g., when the robotic arm 200 operates independently outside of teach mode). Note, however, that external forces may also be applied by other entities in the physical workspace such as by other objects, machines, and/or robotic systems, among other possibilities.

Figure 3:
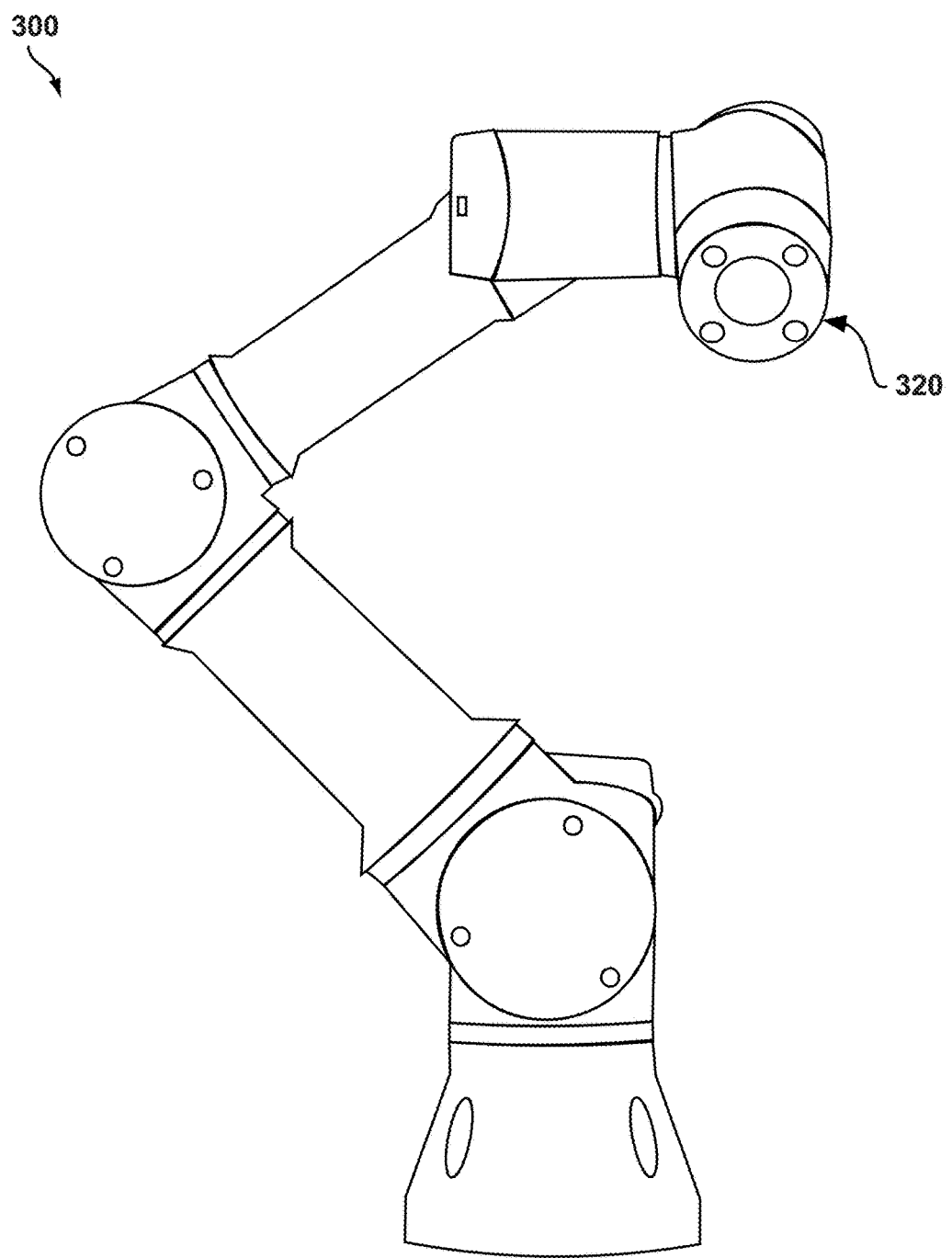
FIG. 3 illustrates an example robotic arm with a force and torque sensor, according to an example implementation.

FIG. 3 illustrates an example robotic arm 300 with an end effector 320. The end effector may include elements of a force and torque sensor as described herein, including a movable structure, curved reflectors, light emitters, photodetectors, and/or any other components described herein. The end effector 320 may include a gripping platform that serves as a base against which an object is gripped.

Some robotic arms may include one or more force and torque sensors, which may be embedded within robotic fingers or gripping platforms. During operation, the robotic arm 300 may position an object between two or more robotic fingers and/or gripping platforms with embedded force and torque sensors. The robotic arm 300 may move the robotic fingers and/or gripping platforms together to grip the object. The object may be pressed against the force and torque sensors, which may measure the amount of force and the direction of that force cause by gripping the object. The measured force vectors may be provided to control systems, which may cause the robotic arm 300 to adjust the grip or otherwise alter its operation.

Some robotic appendages or manipulators may include a wrist situated between an arm and a gripper. Force and torque sensors of the present application may be integrated within the wrist, such that forces and torques applied against the gripper are measured by the sensor. In other words, the force and torque sensor may be placed at a coupling between a gripping platform and the robotic arm. Other arrangements are also possible.

Note that the shape, size, and relative positioning of robotic fingers, gripping platforms, and force and torque sensors may differ, depending upon the particular implementation. The robotic arm 300 illustrates one example configuration of a robotic arm that includes a tactile sensor.

III. EXAMPLE FORCE SENSORS

The following illustrations depict three different views of sensing devices. The example sensing devices include light emitter(s) and photodetectors that are approximately coplanar in an x-y plane and mounted to a base structure. The example sensing device also include a movable structure and curved reflector(s) mounted on a surface of that movable structure facing the light emitter(s) and photodetectors along the z-axis. The movable structure and base structure are approximately parallel at rest.

During operation, the light emitter may project light in the z-direction toward the curved reflector. The emitted light may have an angle of illumination, which causes the projected light to spread as it travels in the z-direction. Some or all of that emitted light may be incident on the curved reflector, which may reflect some or all of that light back toward the photodetectors. Portions of the reflected light may land on the photodetectors (or the photosensitive regions of the photodetectors), while other portions of that reflected light may land on the non-photosensitive regions of the photodetector, the light emitter, the base structure, the movable structure, or another component or area. Thus, a percentage of the total luminous flux (the luminance exitance) emitted by the light emitter may be incident on the photodetectors (the illuminance at the photodetector's photosensitive region)

As the movable structure translates and/or rotates, the position (in the x-, y-, and/or z-direction) and orientation of the curved reflector changes with respect to the rest position (e.g., a reference location of the curved reflector when the movable structure is under no external stresses). This translation and/or rotation of the curved reflectors may vary the illuminance measured by each of the photodetectors. FIGS. 4A-4C, 5A-5C, and 6A-6C illustrate examples changes in illuminance distribution caused by moving the curved reflector.

The top-down views illustrated in FIGS. 4A, 5A, and 6A depict dotted-lined circles and bold-lined circles. The dotted-lined circles represent the "footprint" of the curved reflector when it is at a reference position. The bold-lined circles represent the footprint of the curved reflector when it is at the changed position. A larger bold-lined circle (with respect to the size of the dotted-lined circle) represents the curved reflector moving closer to the photodetectors in the z-direction, while a smaller bold-lined circle represents the curved reflector moving away from the from the photodetectors in the z-direction.

The side views and perspective views illustrated in the FIGS. 4B-4C, 5B-5C, and 6B-6C represent the positions of objects (e.g., the movable structure) at a reference or rest position. Bold arrows at or near the movable structure represent a vector of the net force applied against the movable structure. It should be noted that the vector of the net force may represent a combination of two or more separate forces that combine to form the net force vector. Additionally, the force vector may represent a force experienced by a separate object in contact with the movable structure, such that the force experienced by that object is transferred to the movable structure.

Some of the depicted sensing devices illustrate spring elements that elastically couple the movable structure directly to the base structure. This direct coupling is shown for illustrative purposes only; the spring elements may be coupled to other structures not depicted in the figures. Additionally, the spring elements may not be separate elements, but rather might be a single spring element, such as a flexure.

Additionally, the figures depict the force sensor having rectangular movable structures and base structures. However, structures upon which curved reflectors, light emitters, and/or photodetectors are mounted may take on a variety of shapes and geometries without departing from the scope of the present application.

It should be understood that the following illustrations are conceptual drawings to aid in describing example implementations of the present application. Other configurations, arrangements, dimensions, and combination of components other than those explicitly shown in the figures may be used to implement force and torque sensors of the present application. The drawings are provided for explanatory purposes and may or may not be drawn to scale.

A. Sensor at Rest

FIG. 4A illustrates a side view 400 of a force sensor at rest, FIG. 4B illustrates a top-down view 450 of a force sensor at rest, and FIG. 4C illustrates a perspective view 460 of a force sensor at rest. As described herein, "at rest" refers to the force sensor that is not undergoing any external stresses, such that the movable structure 410 (and the curved reflector 412) is at an equilibrium position.

The force sensor includes a movable structure 410 and a base structure 420 arranged approximately parallel to each other. A curved reflector 412 is fixed to a surface of the movable structure 410 that is facing the base structure 420. The base structure 420 includes a light emitter 422 that is approximately aligned with the curved reflector 412 in the z-direction, such that the curved reflector overlaps the light emitter when viewed from a top-down perspective. The base structure 420 also includes photodetectors 424A, 424B, 424C, and 424D adjacent to the light emitter 422. During operation, the light emitter 422 projects light in the positive z-direction toward the curved reflector, which reflects that projected light (or at least a portion of that reflected light) toward the photodetectors 424A-D with an illuminance distribution 426. The force sensor also includes a spring element 430 that elastically couples the movable structure 410 and the base structure 420. At rest, there is a z-direction displacement 440 between the movable structure 410 and the base structure 420.

The movable structure 410 may be any rigid object (e.g., composed of a non-viscoelastic material). The movable structure 410 may be composed of a variety of rigid materials, including metals or plastics. In some implementations, the movable structure 410 may be composed of two or more separate components. The surface of the movable structure 410 facing away from the base structure 420 may be exposed to the environment, and may act as an interface for interacting with objects and/or for being subjected to forces. The movable structure 410 or surfaces of the movable structure 410 may be non-reflective or otherwise have a low level of reflectance, such that it absorbs most of the light incident on its surface. Such non-reflective materials or coating may be used to prevent or reduce the amount of light incident on the photodetectors that are not direct reflections off the curved reflector 412.

The curved reflector 412 may be any object with a non-planar surface that is either composed of a reflective material or is otherwise coated with a reflective substance. For example, the curved reflector may be a curved piece of reflective metal. As another example the curved reflector may be a curved piece of plastic coated with a reflective paint or pigment. Note that the curved reflector may have any level of reflectance (the percentage of incident light reflected by the curved reflector). In some implementations, the curved reflector 412 may be a separate object from the movable structure and affixed to the movable structure 410 using a fastener, adhesive, or other securing means. In other implementations, the curved reflector 412 may be a protrusion or indentation of the movable structure 410, such that the movable structure 410 and the curved reflector 412 are made from a single piece of material. The curved reflector 412 may be convex, concave, or some combination thereof (e.g., a dimpled surface).

The base structure 420 may be any rigid object with a surface on which the light emitter 422 and the photodetectors 424A-D are mounted or fixed. In some implementations, the base structure 420 may be a printed circuit board (PCB) that provides for conductive coupling among various components, such as the light emitter 422, the photodetectors 424A-D, power sources, ground, integrated circuits, processors, controllers, and/or other possible components. The base structure may also be composed of or coated with a non-reflective substance, so as to prevent or reduce the amount of light incident on the photodetectors that are not direct reflections off the curved reflector 412.

The light emitter 422 may be any light source that projects light toward the curved reflector. In some implementations, the light emitter 422 is a light emitting diode (LED) operable to emit light of a particular wavelength (or within a narrow band of wavelengths) and with a particular angle of illumination. The light emitter 422 may emit light having a brightness (specifically, an illuminance exitance) proportionate to an amount of voltage and/or current supplied to the light emitter 422. The wavelength(s) of light emitted by the light emitter 422 may correspond to the wavelength(s) of light for which the photodetectors 424A-D are sensitive. For example, the light emitter 422 may emit light within a particular band of infrared light, and the photodetectors 424A-D may be operable to measure the illuminance of light within that same (or approximately the same) band of infrared light. The illuminance exitance of the light emitter 422 may decrease over time as the light emitter 422 ages.

The photodetectors 424A-D may be any kind of optical sensor capable of converting light incident on a photosensitive region into voltage, current, capacitance, or charge. In some implementations, the photodetectors 424A-D may be photodiodes or phototransistors that produces a current with a magnitude proportionate to the illuminance of light incident on the photodetector. The photodetectors 424A-D may include optical filters to attenuate or block out light outside of a certain band of wavelengths. The photodetectors 424A-D may also include other components, such as lenses and mechanical support structures. The photodetectors 424A-D may be arranged in a "+" pattern, such that photodetectors 424A and 424B form an axis (in the figures, the y-axis) and photodetectors 424C and 424D form another axis (in the figures, the x-axis). When arranged in this manner, the photodetectors 424A-D measure illuminance values in positive and negative x- and y-directions.

Note that, in some implementations, three photodetectors may be used to determine the x- and y-position of the curved reflector, without requiring the fourth photodetector (as long as the three photodetectors are not collinear). As one example, three photodetectors may be arranged in a triangular shape, with the light emitter 422 placed within the area defined by the three photodetectors. Although the examples illustrated herein depict four photodetectors surrounding a light emitter, it should be understood that three photodetectors are sufficient for determining the position of the curved reflector in three degrees of freedom (e.g., the x-axis, y-axis, and z-axis).

At rest, the illuminance distribution 426 is such that the photodetectors 424A-D each are fully illuminated by respective portions of light reflected off the curved reflector 412. This is illustrated as dotted-lined arrows that extend across the entirety of the photodetectors 424A and 424B in FIG. 4A. This representation of illuminance is provided for illustrative purposes; a fully-illuminated area may not necessarily correspond to a particular illuminance level. It should be understood that the illuminance distribution may be affected by a variety of factors, including angular extent of illumination provided by the light emitter 422, the total illuminance exitance of the light emitter 422, the reflectance of the curved reflector 412, the geometry of the curved reflector 412, and the position of the curved reflector 412, among other possible factors.

The spring element 430 may be any elastic object that is at least coupled to the movable structure 410. The spring element 430 may elastically couple the movable structure 410 with the base structure 420, or may elastically couple the movable structure 410 to another fixed structure not explicitly illustrated in the figures. For example, the base structure 420 may be rigidly fixed to a housing, and the movable structure 410 may be elastically coupled to the housing via the spring element 430. The spring element 430 may be any object that can elastically expand and/or contract, such as a flexure. A flexure may, for example, be a semi-rigid material with pleated layers that behaves similarly to a spring (or a damped spring).

B. Sensor Subjected to a Downward Force

FIGS. 5A, 5B, and 5C illustrate a side view 500, top-down view 550, and a perspective view 560 of a force sensor subjected to a downward force, respectively. In this example, "downwards" refers to a net force in the negative-z direction. For the following example, the net force is applied at the center of the movable structure 510, such that movable structure 510 translates in the negative z-direction without rotating.

In this example, a force having a net force vector 502 is applied against the movable structure 510, causing it to translate from its rest position 410 (as illustrated by the dotted lined rectangle). This force causes the spring element 430 to compress from its rest length 440 to a compressed length 540. As a result, the z-directional distance between the curved reflector 412 and the light emitter 422 is decreased.

By reducing the z-directional distance between the curved reflector 512 and the light emitter 422, the illuminance distribution changes from distribution 426 to distribution 526. As a result, the portion of light reflected off the curved reflector 412 and incident on the photodiodes 424A and 424B only land on a section of the photodetector. Thus, the measured illuminances at photodetectors 424A and 424B may differ from the measured illuminances of distribution 426. The remaining portion of light reflected off the curved reflector 412 may be incident on (and partially or fully absorbed by) the base structure 420 and/or the light emitter 422. Note that, although not depicted, the illuminances at photodetectors 424C and 424D may be affected similarly to photodetectors 424A and 424B.

Based on the measured illuminance values by the photodetectors 424A-D, the position of the curved reflector 412 (or movable structure 410, since they are rigidly coupled) relative to a reference position (e.g., the rest position of the curved reflector 412) may be determined. This change in position from the reference position to the translated position may be represented as a displacement vector, which includes a direction of displacement and a magnitude (distance) of displacement.

Determining the displacement vector of the curved reflector may involve providing the measured illuminance values to a computing device, which carries out operations on those illuminances to determine the position. For example, a computing device may include thereon a model of the force sensor, which includes a relationship between illuminance distribution and displacement vectors. The measured illuminances may represent sample measurements of an illuminance distribution (generally, the manner in which light is reflected back onto the photodetectors). Then, the measured illuminances may be provided to the model, and a displacement vector (indicative of an estimated direction and magnitude of displacement) may be provided as an output. This displacement output may then be provided as an output to other computing devices, control systems, or serve as a basis for determining the vector of the force applied against the movable structure 510.

Based on the determined displacement vector (in this example, a vector in the negative z-direction), a computing device or other processing device may determine the vector 502 of the negative z-direction force applied against the movable structure. A model of the force sensor may correlate displacement vectors with force vectors, such that providing the estimated displacement vector to the model outputs a corresponding force vector. This relationship between displacement and force may be predetermined based on known properties of the spring element 430. For example, a constant force of a particular magnitude in the negative z-direction will cause the springs to compress until they reach a known equilibrium length based on the spring constant of the spring element 430.

The relationship between displacement and force may also be determined based on calibration data. For example, a calibration sequence might translate the curved surface by a known distance in a known direction, and the force applied against a testing apparatus (resisting the translation) may be measured. Alternatively, a calibration sequence might apply a force of a known direction and magnitude against the movable structure 410 and measure the illuminances at the photodetectors 424A-D. Thus, in some implementations, the intermediate step of explicitly determining the displacement may be omitted, and the force vector may be estimated or determined based solely on the illuminance measurements.

C. Sensor Subjected to a Lateral Force

FIGS. 6A, 6B, and 6C illustrate a side view 600, top-down view 650, and a perspective view 660 of a force sensor subjected to a lateral force, respectively. In this example, "lateral" refers to a net force in the negative-y direction. However, "lateral" may refer to any force or force component along the x-axis and/or along the y-axis. For the following example, the net force is applied at the center of the positive x-direction edge of the movable structure 510, such that movable structure 510 translates in the negative x-direction without rotating.

In this example, a force having a net force vector 602 is applied against the movable structure 610, causing it (and the curved reflector 612) to translate from its rest position 410 (as illustrated by the dotted lined rectangle). This force causes the spring element 430 to expand from its rest length 440 to an expanded length. As a result, the x-directional distance between the curved reflector 412 and the light emitter 422 is increased from zero to distance 642.

By moving the curved reflector in the negative x-direction by distance 642, the illuminance distribution changes from distribution 426 to distribution 626. As a result, significantly less light is reflected off the curved reflector 412 and incident on photodetector 424A, while photodetector 424B continues to be fully illuminated by light reflected off the curved reflector 412. Thus, the measured illuminance at photodetector 424A may decrease to zero (or approximately zero), while the illuminance at photodetector 424B may remain the same (or possibly increase, depending on whether the curved reflector concentrates a greater portion of light onto the photodetector 424B). The remaining portion of light reflected off the curved reflector 412 may be incident on (and partially or fully absorbed by) the base structure 420 and/or the movable structure 610. Note that, although not depicted in FIG. 6A, the illuminances at photodetectors 424C and 424D may also be affected.

Based on the measured illuminance values by the photodetectors 424A-D, the position of the curved reflector 412—or, more specifically, the displacement vector representing the distance 642 in the negative x-direction—the position of the curved reflector 412 (or movable structure 410, since they are rigidly coupled) relative to a reference position (e.g., the rest position of the curved reflector 412) may be determined. Additionally, based on the determined displacement vector (in this example, a vector in the negative z-direction), a computing device or other processing device may determine the vector 602 of the negative x-direction force applied against the movable structure.

Note that, in the examples described above, the net force was applied in a direction that did not cause the movable structure to rotate. Put differently, the force was applied at an angle and direction that did not produce a net torque, which could cause the movable structure to rotate by some amount of angular displacement. The examples below describe a force and torque sensor configuration capable of measuring both forces and torques (e.g., force measurements in 6 DOFs).

IV. EXAMPLE FORCE AND TORQUE SENSORS

A. Sensor at Rest

Figure 7A:
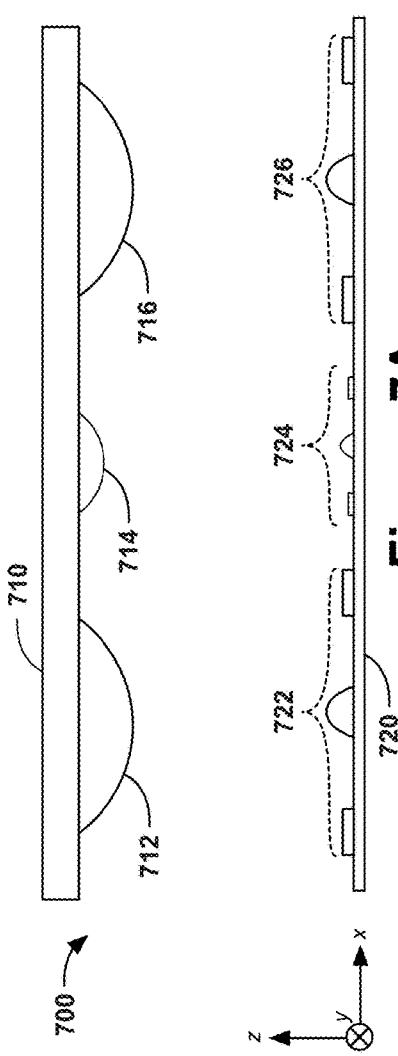
FIG. 7A illustrates a side view of a force and torque sensor at rest, according to an example implementation.
Figure 7C:
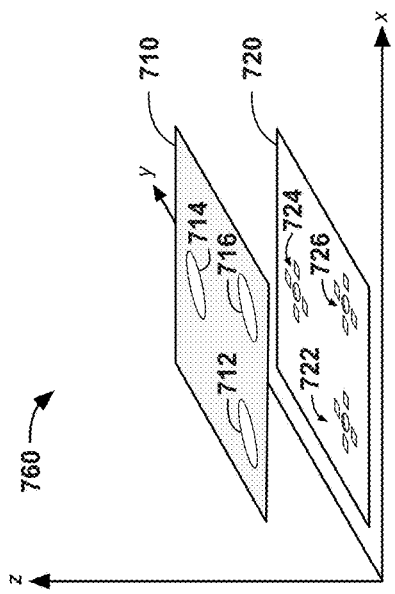
FIG. 7C illustrates a perspective view of a force and torque sensor at rest, according to an example implementation.
Figure 7B:
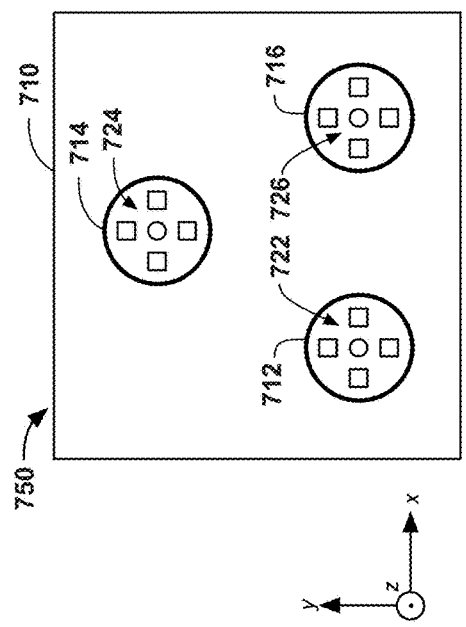
FIG. 7B illustrates a top-down view of a force and torque sensor at rest, according to an example implementation.

FIGS. 7A, 7B, and 7C illustrate a side view 700, top-down view 750, and a perspective view 760 of a force and torque sensor at rest, respectively. The force and torque sensor includes three curved reflectors 712, 714, and 716 fixed to a movable structure 710, along with three optical sensor assemblies 722, 724, and 726 fixed to a base structure 720. Each optical sensor assembly includes a photodetector cluster and a light emitter.

The force and torque sensor may be similar to the force sensor described above. The movable structure 710 may be similar to or the same as the movable structure 410 described above. Each curved reflector 712, 714, and 716 may be similar to or the same as the curved reflector 412 described above. The base structure 720 may be similar to or the same as the base structure 420 described above. Each light emitter may be similar to or the same as the light emitter 422 described above. Each photodetector in the photodetector clusters may be similar to or the same as the photodetectors 424A-D described above. Although not illustrated in the following figures, the force and torque sensor may also include spring elements similar to the spring element 430 described above.

At rest, each curved reflector may be approximately aligned with a respective optical sensor assembly, similarly to the rest alignment of curved reflector 412 and the light emitter 422 described above.

Although not illustrated below, some forces applied against movable structure 710 may cause the movable structure 710 to translate. Such translational motion without any rotation causes each of the curved reflectors 712, 714, and 716 to be displaced by the same amount in the same direction. As a result, displacement and force may be determined in a similar manner as described above with respect to the force sensor. In some implementations, determining that a force is applied against the movable structure 710 that does not produce a torque on the movable structure 710 may involve determining the displacement for each of the curved reflectors, and comparing those displacement vectors. If the displacement vectors for each of the curved reflectors is the same (or approximately the same), then the sensor may output a torque value of zero.

Note that a torque may be experienced at the movable structure 710 as a result of one or more forces with components tangential to a rotation axis, or may be experienced as a moment of force (e.g., a "pure" moment with no net force component). Torque values may be relative to a particular coordinate system, which can be defined in a variety of ways. For example, a coordinate system may be defined to have an origin located at the centroid of three curved reflectors, where the z-axis is normal to the surface of the movable structure 710, and the x-axis and y-axis are coplanar to the surface of the movable structure 710. In this example, the x-axis and y-axis can be oriented in a number of ways (i.e., rotated about the z-axis); for instance, if the x-axis and y-axis are rotated by 90 degrees, a force previously determined to be an x-directional force may now be considered a y-directional force. Thus, the direction of a force vector may be relative to a specific coordinate system.

A torque may cause the movable structure 710 to rotate about some axis. Since the coordinate system may be defined in a variety of ways, torque values may be defined relative to a specific coordinate system. For example, a torque might cause the movable structure 710 to pitch, roll, or some combination thereof, depending on the orientation of the specific coordinate system. In one coordinate system, a force might be applied through its origin and be aligned with an axis of that coordinate system; however, the same force in a different coordinate system may be applied at some distance from the origin and/or at some angle relative to an axis of the different coordinate system. Thus, a "pure force" that produces no torque in one coordinate system may produce a torque in another coordinate system. Accordingly, any determination of force or torque values may be relative to a specific coordinate system.

Because displacement and force determinations for the force and torque sensor are similar to the displacement and force determinations for the force sensor, that description is omitted below. However, it should be understood that the force and torque sensor may be used to determine force vectors that do not induce a torque on the movable structure 710.

B. Subjected to a Downward Force

FIGS. 8A, 8B, and 8C illustrate a side view 800, top-down view 850, and a perspective view 860 of a force and torque sensor subjected to a downward force 802, respectively. In this example, the downward force 802 is a negative z-directional force applied at the negative x-directional edge of the movable structure 810. The application of force 802 against the movable structure 810 causes the movable structure to rotate about the y-axis (herein, "roll"). Thus, the movable structure 810 is tilted with respect to the rest position 710.

As a result of the rotation, the curved reflector 812 is moved closer (in the z-direction) to the optical sensor assembly 722, the curved reflector 814 is moved closer (in the z-direction) to the optical sensor assembly 724 by a lesser amount, and the curved reflector 816 is moved closer to the optical sensor assembly 726 by an even lesser amount. This difference in z-directional displacement is illustrated in FIG. 8B, wherein the footprint for curved reflector 812 has the largest radius and the footprint for curved reflector 816 has a smallest radius (compared to the footprints for the curved reflectors 812, 814, and 816).

The rotated movable structure 810 affects the illuminance distributions measured at each optical sensor assembly differently, since the z-directional displacement for each of the curved reflectors 812, 814, and 816 is different. In some embodiments, the displacement vectors (or the spatial locations with respect to respective reference positions) for each of the curved reflectors 812, 814, and 816 is determined based on the respective illuminance distributions. Based on those displacement vectors, the extent of rotation (e.g., the angular displacement) of the movable structure 810 can be determined.

As described herein, the angular displacement of a movable structure may represent a rotational orientation of the movable structure with respect to a reference orientation. The reference orientation may be an angular position of the movable structure while the movable structure is at rest. The rotational orientation of the movable structure may be an angular position of the movable structure when subjected to a force. The angular displacement may be represented as having a magnitude and a direction. The direction may specify the axis about which the movable structure is rotated, while the magnitude may specify the rotation of the movable structure (e.g., in radians or degrees) about that axis.

Based on the displacement vectors for the curved reflectors 812, 814, and 816 (or the estimated angular displacement), the torque resulting from the force applied against the movable structure can be determined. In some implementations, the torque vector may not be explicitly determined, and instead the force vector and the location at which it is applied against the movable structure 810 may be determined. The force and torque sensor may output the force vector and its applied location, from which a separate processing device may determine the torque vector.

In other implementations, the torque vector may be determined based on a relationship between the sets of displacement vectors of the curved reflectors and torque vectors. Alternatively, the torque vector may be determined based on a relationship between angular displacement values and torque vectors. Regardless of the implementation, a model or calibration data may be used to estimate or determine force vectors and/or torque vectors based on a set of measured illuminance distributions, a set of displacement vectors, and/or an angular displacement value.

FIGS. 9A, 9B, and 9C illustrate a side view 900, top-down view 950, and a perspective view 960 of a force and torque sensor subjected to a downward force 902, respectively. In this example, the downward force 902 is a negative z-directional force applied at the negative y-directional edge of the movable structure 910. The application of force 902 against the movable structure 910 causes the movable structure to rotate about the x-axis (herein, "pitch").

Similarly to the example described above, a pitched movable structure 910 may non-uniformly change the illuminance distributions for the optical sensor assemblies 722, 724, and 726 due to non-uniform displacements of reflectors 912, 914, and 916. Sets of displacement vectors, angular displacement values, force vectors, and/or torque vectors may be determined in a similar manner as described above.

The downward force 902 is illustrated in FIG. 9B as a circle with an "X" through its center. As illustrated in the figures, a circle with an "X" represents an "into the page" direction; in FIG. 9B, this is the negative z-direction. Also, as illustrated in the figures, a circle with a dot in its center represents an "out of the page" direction; although not depicted in FIG. 9B, this would be the positive z-direction.

C. Subjected to a Lateral Force

FIGS. 10A, 10B, and 10C illustrate a side view 1000, top-down view 1050, and a perspective view 1060 of a force and torque sensor subjected to a lateral force 1002, respectively. In this example, the lateral force 1002 is applied against the edge of the movable structure 1010, such that is causes the movable structure 1010 to rotate about the z-axis (herein, "yaw"). Thus, the movable structure 1010 is turned with respect to the rest position 710.

As a result of the rotation, the curved reflector 1012 is moved in the negative x-direction and the positive y-direction, the curved reflector 1014 is moved in the positive x-direction and the negative y-direction, and the curved reflector 1016 is moved in the negative x-direction and the negative y-direction. Collectively the curved reflectors 1012, 1014, and 1016 rotate about their centroid in a clockwise fashion when viewed from the top-down (as illustrated in FIG. 10B).

Because each of the curved reflectors 1012, 1014, and 1016 translate by different amounts in different directions, the illuminance distributions measured by the optical sensor assemblies 722, 724, and 726 will each differ from each other. From these illuminance distributions, the displacements for each of the curved reflectors 1012, 1014, and 1016, the angular displacement (e.g., angle of yaw), and the vector of the torque experienced by the movable structure 1010 may be determined.

Note that, due to manufacturing variations and other sources of imperfection, the illuminances measured by each optical sensor assembly may differ from each other, even if the reflectors are in the same position with respect to their corresponding emitter and receiver cluster. Such manufacturing imperfections may be accounted for during calibration.

V. POSITION SENSING

The sensor configurations, component arrangements, and sensing techniques disclosed herein may be used to implement a displacement sensor. In some applications, determining the displacement vector of a curved reflector may be used to provide for sensitive displacement measurements. For example, a controller (e.g., a joystick) may measure small changes in displacement, which may serve as an input into a computer program or game. It should be understood that techniques and configurations disclosed herein may be used to implement a position sensor that may or may not also measure forces and torques.

Some sensors described herein may be configured to measure and output displacement in one or more degrees of freedom (DOFs). Some displacement DOFs may be translational displacements (i.e., change in translational position) while other displacement DOFs may be angular displacements (i.e., change in orientation or angular position). In some implementations, a sensor may be configured to measure one or more translational displacement DOFs and one or more angular displacement DOFs (e.g., x-directional displacement, z-directional displacement, and roll, as one example). Any combination of translational DOFs and angular DOFs may be measured, depending on the number and arrangement photodetectors, light emitters, and curved reflectors within a particular force and torque sensor.

Likewise, some sensors described herein may be configured to measure and output forces in one or more degrees of freedom (DOFs). Some force DOFs may be translational forces (e.g., x-direction, y-direction, z-direction) while other force DOFs may be rotation-inducing torques (e.g., yaw, pitch, roll). As described herein, a force DOF may be either a force or q torque. Thus, a sensor configured to measure forces in one or more DOFs may measure forces, torques, or some combination thereof.

A sensor with a single curved reflector may be operable to measure displacements and/or forces in three DOFs—that is, any combination of x-direction, y-direction, z-direction, roll, pitch, and yaw. Some sensor applications may involve measuring displacements and/or forces in a particular set of DOFs, such that a 6-DOF sensor is not required. If the particular DOFs are known, a particular sensor's components may be arranged to measure displacements and/or forces in those particular DOFs. In this manner, the number of components used to implement a specific-application sensor may be reduced. In some cases, ignoring one or more DOFs may also serve to improve the accuracy of the measured DOFs.

VI. CALIBRATION OF FORCE AND TORQUE SENSORS

A particular force and torque sensor may be modeled in various ways. As one example, the dimensions, layout of components, orientation of components, and properties of the components of a force and torque sensor may provide for geometric and mathematical relationships that enable a processing device to infer some properties (e.g., force vectors) on the basis of other measurements (e.g., illuminances measured by photodetectors). For instance, if the layout of the components is known, the reflective properties and geometry of the curved reflector is known, and the illuminance exitance of the light emitter is known, then measured illuminances may be applied to the model to infer the location of the curved reflector with respect to a reference position. Further, if the dimensions and properties of a spring element (e.g., a flexure) is known, then displacement vectors may be correlated with force vectors.

However, due to imperfections in manufacturing and potential errors in modelling, such a model may not accurately reflect displacement and/or force vectors for a given illuminance distribution of a specific force and torque sensor. For example, the light emitters and photodetectors may not be oriented perfectly due to variances in solder connections. As another example, the curved reflector may not be mounted perfectly, or may contain imperfections that affect the reflectance of the curved reflector. As yet another example, imperfections in spring elements may cause the curved reflector's equilibrium position to not be perfectly aligned with the light emitter.

Thus, in some implementations, a constructed force and torque sensor may be subjected to a series of forces and/or torques in a testing apparatus, and may be correlated with measured illuminances at the photodetectors. The testing apparatus may apply known forces at known directions, and correlate those values with the measured illuminances in a table or other data storage element. Once the testing has been completed and calibration data has been collected, mathematical analyses may be employed to derive a functions or relationships between sets of measured illuminances, displacement vectors, force vectors, and/or torque vectors.

In some implementations, a relationship between measured illuminances and force vectors may be determined by performing a linear regression (or other regression) on the calibration data. In this manner, a continuous (or semi-continuous) function or mapping between sets of measured illuminances and force vectors may be derived. Regression analysis may be applied between any two parameters or sets of parameters in order to generate a relationship between those two parameters or sets of parameters.

In some implementations, the calibration data may serve as a basis for calculating transformation matrices for determining force vectors from displacement vectors and/or for determining torque vectors from rotation vectors.

In some implementations, an additional photodetector may be included within a force and torque sensor that measures the luminance (i.e., the luminance exitance) of the light emitter. As the light emitter ages, the brightness of the light emitter may decrease. As a result, the accuracy of a force and torque sensor may worsen over time. The additional photodetector (which may also be referred to herein as the "calibration" or "reference" photodetector) may be situated at a location within the force and torque sensor that measures the same illuminance regardless of the of the position of the curved reflector and the movable structure. Thus, the calibration photodetector may measure an illuminance that is indicative of the brightness of the photodetector.

In some implementations, the calibration photodetector may measure an illuminance during operation that represents the brightness of the light emitter (herein, the "calibration illuminance"). The calibration illuminance may be compared against a reference illuminance in order to determine the extent to which the light emitter has decreased in brightness over time. Based on this comparison, a scaling factor may be determined indicating an amount by which to adjust the magnitude of displacement, force, and/or torque vectors to account for the degradation of light emitter brightness. In some implementations, the scaling may be applied to the measured voltages at the photodetectors, while subsequent transformations are carried out based on the adjusted photodetector voltages.

VII. EXAMPLE FORCE DETERMINATION METHODS

Figure 11A:
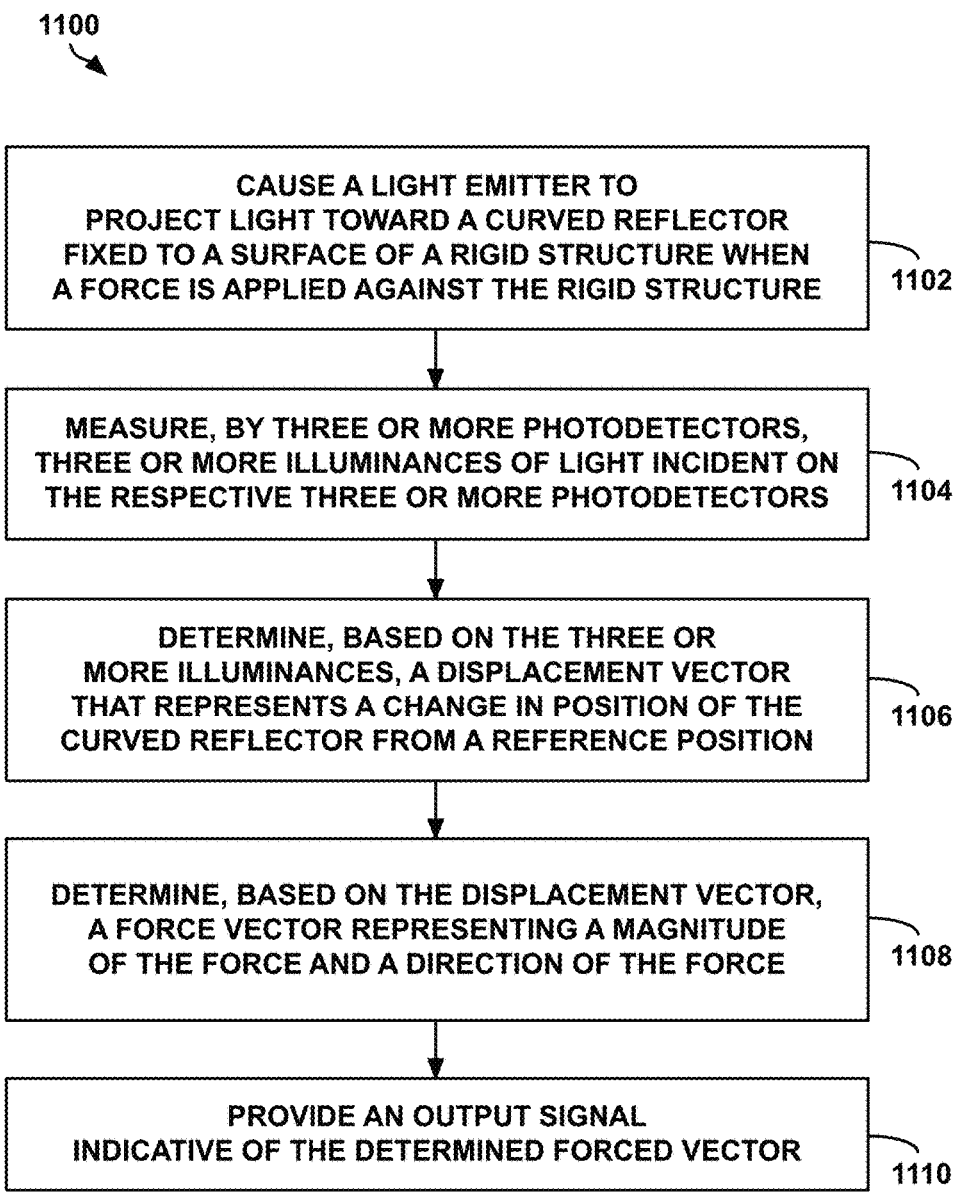
FIG. 11A illustrates a flow chart, according to an example implementation.

FIG. 11A is a flowchart of operations 1100 for determining a vector of a force applied against a movable structure of a force sensor, according to an example implementation. Operations 1100 shown in FIG. 11A present an implementation that could be used by computing devices or control systems. Operations 1100 may include one or more actions as illustrated by blocks 1102-1100. Although the blocks are illustrated in sequential order, these blocks may also be performed in parallel, and/or in a different order than those described herein. Also, the various blocks may be combined into fewer blocks, divided into additional blocks, and/or removed based upon the directed implementation.

In addition, the operations 1100 and other operations disclosed herein show functionality of one possible implementation. In this regard, each block may represent a module, a segment, or a portion of program code, which includes one or more instructions executable by a processor or computing device for implementing specific logical operations or steps. The program code may be stored on any type of computer-readable medium, for example, such as a storage device included in a disk or hard drive. The computer-readable medium may include a non-transitory computer-readable medium, for example, such as computer-readable media that stores data for short periods of time like register memory, processor cache and/or random access memory (RAM). The computer-readable medium may also include non-transitory media, such as secondary or persistent long-term storage, like read-only memory (ROM), optical or magnetic disks, and compact-disc read-only memory (CD-ROM), for example. The computer-readable media may be considered a computer-readable storage medium, for example, or a tangible storage device.

In addition, one or more blocks in FIG. 11A may represent circuitry that is wired to perform the specific logical operations.

In the following description, blocks 1102-1110 are performed by a control device. The control device may be any device or combination of devices that can operate components of a force and torque sensor, read measurements from sensing devices such as photodetectors, process the measurements, and/or carry out mathematical, computational, or programmatic operations on data stored in memory or storage devices. Additionally, the control device may retrieve information, such as models or calibration data, stored in program instructions, memory, or a storage device, and may use that information as a basis for performing operations on the measurements. It should be understood that the control device may take on many forms, and may include any number of processors, cache, memory devices, storage devices, integrated circuits, and/or other circuit components (e.g., application specific integrated circuits, amplifiers, etc.).

A. Cause a Light Emitter to Project Light Toward a Curved Reflector

At block 1102, a control device causes a light emitter to project light toward a curved reflector fixed to a surface of a rigid structure when a force is applied against the rigid structure. Causing the light emitter to project light may involve energizing the light emitter by coupling it to a power source. For example, if the light emitter is an LED, causing the light emitter to project light might involve operating a switch (e.g., a transistor) to begin conducting current from a power source to the terminals of the LED.

In some implementations, the light emitter may continuously project during operation, whether or not a force is applied against the rigid structure. In other implementations, the light emitter may begin emitting when a force begins acting on the rigid structure. For instance, the force and torque sensor may include an accelerometer that detects changes in the position of the rigid structure. Upon detecting this change, the control device may begin conducting current to the light emitter, causing it to turn on.

B. Measure Illuminances of Light Incident on Photodetectors

At block 1104, a control device measures three or more illuminances of light incident on respective three or more photodetectors. The photodetectors may convert incident light into a voltage, current, or charge proportionate to the intensity of that incident light (that is, the illuminance). The control device may include thereon circuit components for converting voltage, current, or charge levels into digital values that it then stores in a local memory or cache. For example, the control device may include analog to digital converters (ADCs) that receive the analog output from the photodetectors and provides to the processor of the control device digital values representing the values of the photodetector output signals. The control device may store the measurements in memory (e.g., volatile memory or a non-volatile storage medium).

C. Determine a Displacement Vector Based on the Illuminances

At block 1106, a control device determines, based on the three or more illuminances, a displacement vector that represents a change in position of the curved reflector from a reference position. In some implementations, the reference position may be predetermined and stored in the control device's memory or within program instructions. The control device may determine the position of curved reflector relative to the reference position. Block 1106 may involve providing the measured illuminances to a model or relationship derived from calibration data, as described above. The displacement vector may include a direction of displacement and a distance of that displacement. The displacement vector may be a combination of displacement vector components in one or more degrees of freedom (e.g., in the x-direction, y-direction, and/or z-direction).

D. Determine a Force Vector Based on the Displacement Vector

At block 1108, a control device determines, based on the displacement vector, a force vector representing a magnitude of the force and a direction of the force. As described above, determining the force vector based on the displacement vector may involve providing the displacement vector as an input to a model, relationship, or transformation matrix.

In some implementations, determining an angular displacement may involve obtaining a reference coordinate system that is indicative of an orientation of the rigid structure with no torque applied to the rigid structure. The force and torque sensor may then determine a loaded coordinate system, which represents the orientation of the rigid structure when the rigid structure is experiencing a force applied against it. The orientation of the rigid structure may be the orientation of a plane defined by the spatial positions of three or more curved reflectors coupled to the rigid structure. Then, the control device may determine the angular displacement based on a comparison between the reference coordinate system and the loaded coordinate system.

Note that, in some implementations, the control device may determine the force vector based on the illuminance measurements, without carrying out the intermediate step of determining the displacement vector. For example, calibration data may correlate a plurality of illuminance measurements with a respective plurality of force vectors. From this calibration data, a computing device (e.g., the control device) may perform a regression analysis in order to derive a relationship between illuminance measurements and force vectors (e.g., linear regression). Then, the control device may provide the illuminance measurements as inputs to the relationship, which outputs a force vector.

E. Provide an Output Signal Indicative of the Force Vector

At block 1110, a control device provides an output signal indicative of the determined force vector. The force and torque sensor may be incorporated within a robotic system, such as a robotic arm or appendage. The force and torque sensor may measure force vectors and/or torque vectors, which may then be provided as an output signal (e.g., an electrical signal carrying digital data) to other devices of the system. For instance, the force and torque vector measurements may be provided to a control system of a robot, which may then modify aspects of the robot's behavior (e.g., adjust the grip strength of a robotic arm or robotic finger) or otherwise operate actuators of the robot.

In other instances, the output signal may be provided to a data acquisition system or other device that may record the force vectors and/or torque vectors and store them in a memory device over a period of time. The recorded measurements may be viewed on a display device or may be processed by a computing device.

VIII. EXAMPLE TORQUE DETERMINATION METHODS

Figure 11B:
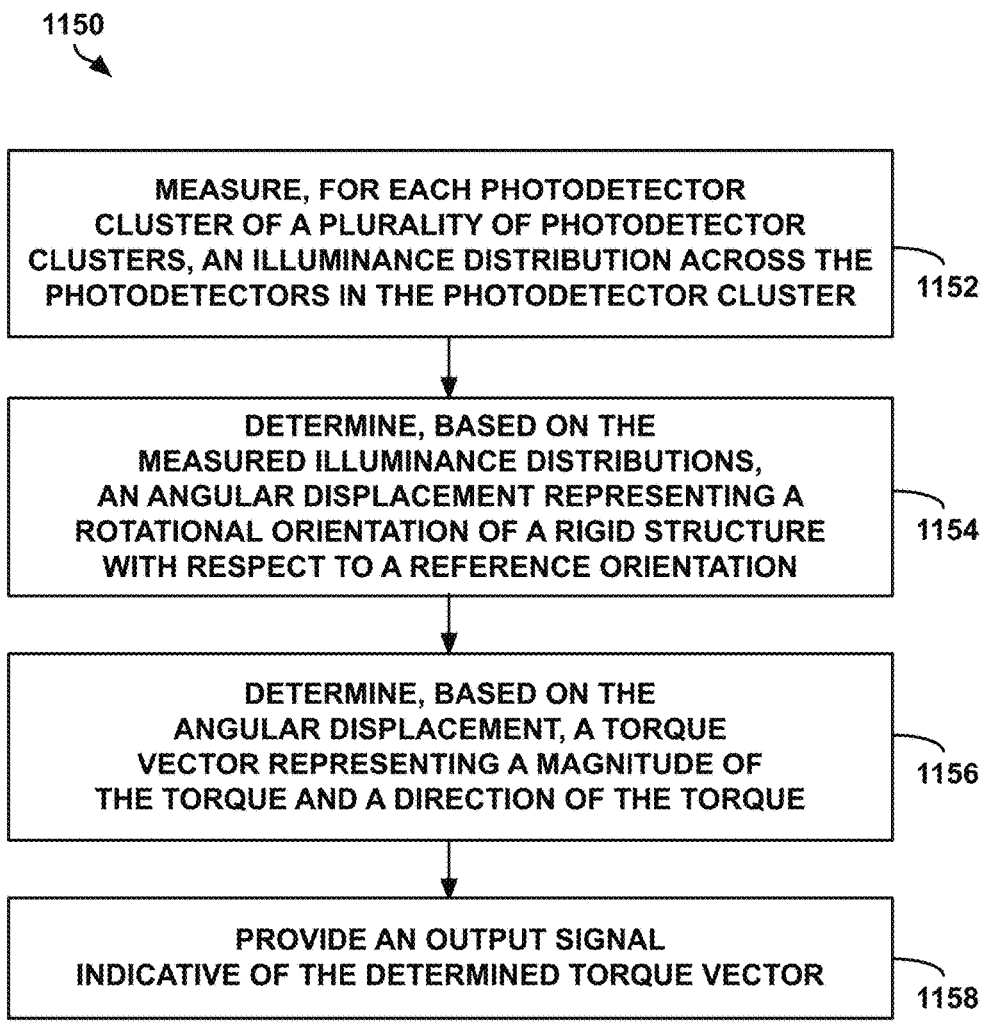
FIG. 11B illustrates a flow chart, according to an example implementation.

FIG. 11B is a flowchart of operations 1150 for determining a vector of a force applied against a movable structure of a force sensor, according to an example implementation. Operations 1150 shown in FIG. 11 present an implementation that could be used by computing devices or control systems. Operations 1100 may include one or more actions as illustrated by blocks 1152-1158. Although the blocks are illustrated in sequential order, these blocks may also be performed in parallel, and/or in a different order than those described herein. Also, the various blocks may be combined into fewer blocks, divided into additional blocks, and/or removed based upon the directed implementation.

In addition, the operations 1150 and other operations disclosed herein show functionality of one possible implementation. In this regard, each block may represent a module, a segment, or a portion of program code, which includes one or more instructions executable by a processor or computing device for implementing specific logical operations or steps. The program code may be stored on any type of computer-readable medium, for example, such as a storage device included in a disk or hard drive. The computer-readable medium may include a non-transitory computer-readable medium, for example, such as computer-readable media that stores data for short periods of time like register memory, processor cache and/or random access memory (RAM). The computer-readable medium may also include non-transitory media, such as secondary or persistent long-term storage, like read-only memory (ROM), optical or magnetic disks, and compact-disc read-only memory (CD-ROM), for example. The computer-readable media may be considered a computer-readable storage medium, for example, or a tangible storage device.

In addition, one or more blocks in FIG. 11B may represent circuitry that is wired to perform the specific logical operations.

In the following description, blocks 1152-1158 are performed by a control device. The control device may be any device or combination of devices that can operate components of a force and torque sensor, read measurements from sensing devices such as photodetectors, process the measurements, and/or carry out mathematical, computational, or programmatic operations on data stored in memory or storage devices. Additionally, the control device may retrieve information, such as models or calibration data, stored in program instructions, memory, or a storage device, and may use that information as a basis for performing operations on the measurements. It should be understood that the control device may take on many forms, and may include any number of processors, cache, memory devices, storage devices, integrated circuits, and/or other circuit components (e.g., application specific integrated circuits, amplifiers, etc.).

The control device may be integrated within a force and torque sensor that includes a rigid structure, a plurality of curved reflectors fixed to a surface of that rigid structure, a plurality of photodetector clusters, and a plurality of light emitters. Each photodetector cluster may capture a set of illuminance measurements, collectively referred to as the "illuminance distribution." The force and torque sensor may be similarly configured to the force and torque sensor illustrated in FIGS. 7A-7C.

A. Measure a Plurality of Illuminance Distributions

At block 1152, a control device measures, for each photodetector cluster of the plurality of photodetector clusters, an illuminance distribution across the photodetectors in the photodetector cluster. Each photodetector cluster may contain three or more photodetectors, each of which may measure an illuminance at an area defined by the photosensitive region of that photodetector. Collectively, the set of illuminance measurements captured by a photodetector cluster may be referred to as an illuminance distribution.

B. Determine an Angular Displacement Based on the Measured

Illuminance Distributions

At block 1154, a control device determines, based on the measured illuminance distributions, an angular displacement representing a rotational orientation of the rigid structure with respect to a reference orientation. The rigid structure may be in a reference orientation when not subjected to an external force (or, when a force applied against the rigid structure does not cause the rigid structure to rotate). When the rigid structure is subjected a torque, it may rotate, causing it to move to a rotational orientation (e.g., a different angular position compared to the reference orientation). The angular displacement—including the axis about which the rigid structure rotates and the extent of rotation (e.g., in radians or degrees)—may be determined based on the reference orientation and the rotational orientation.

The spatial locations of three or more curved reflectors may define a plane or a coordinate system, which may serve as a reference from which the angular displacement is determined. A reference plane or reference coordinate system may be predetermined or stored on a memory of the control device, representing the orientation of the rigid structure at rest. When the rigid structure is subjected to a torque that causes the rigid structure to rotate, the curved reflectors may move from their rest locations to different spatial locations. When the curved reflectors are at these different spatial locations, a rotated plane or rotated coordinate system (also referred to herein as a "loaded" coordinate system) may be determined. By comparing the reference plane or reference coordinate system to the rotated plane or rotated coordinate system, the control system may determine the angular displacement of the rigid structure.

C. Determine a Torque Vector Based on the Angular Displacement

At block 1156, a control device determines, based on the angular displacement, a torque vector representing a magnitude of the torque and a direction of the torque. As described above, determining the torque vector based on the angular displacement may involve providing the displacement vector as an input to a model, relationship, or transformation matrix.

Note that, in some implementations, the control device may determine the torque vector based on the measured illuminance distributions, without carrying out the intermediate step of determining the angular displacement of the rigid structure. For example, calibration data may correlate a plurality of illuminance distribution measurements with a respective plurality of torque vectors. From this calibration data, a computing device (e.g., the control device) may perform a regression analysis in order to derive a relationship between illuminance measurements and force vectors (e.g., linear regression). Then, the control device may provide the measured illuminance distributions as inputs to the relationship, which outputs a torque vector.

D. Provide an Output Signal Indicative of the Torque Vector

At block 1158, a control device provides an output signal indicative of the determined torque vector. The force and torque sensor may be incorporated within a robotic system, such as a robotic arm or appendage. The force and torque sensor may measure force vectors and/or torque vectors, which may then be provided as an output signal (e.g., an electrical signal carrying digital data) to other devices of the system. For instance, the force and torque vector measurements may be provided to a control system of a robot, which may then modify aspects of the robot's behavior (e.g., adjust the grip strength of a robotic arm or robotic finger) or otherwise operate actuators of the robot.

In other instances, the output signal may be provided to a data acquisition system or other device that may record the force vectors and/or torque vectors and store them in a memory device over a period of time. The recorded measurements may be viewed on a display device or may be processed by a computing device.

IX. EXAMPLE COMPUTER-READABLE MEDIUM

Figure 12:
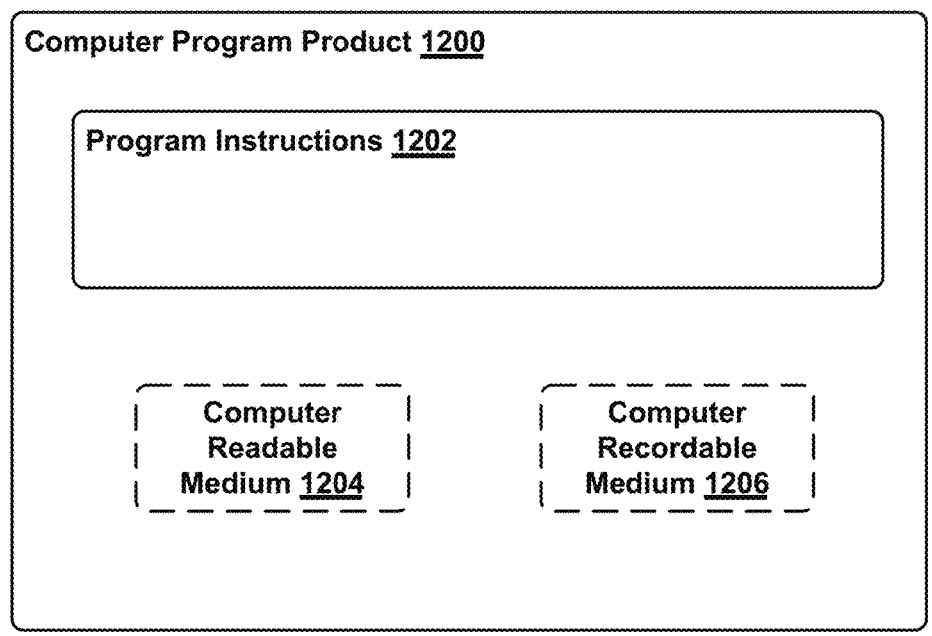
FIG. 12 is a block diagram of an example computer-readable medium according to an example embodiment.

FIG. 12 illustrates an example computer-readable medium configured according to at least some implementations described herein. In example implementations, the example system can include one or more processors, one or more forms of memory, one or more input devices/interfaces, one or more output devices/interfaces, and machine readable instructions that when executed by the one or more processors cause a robotic device to carry out the various operations, tasks, capabilities, etc., described above.

As noted above, the disclosed procedures can be implemented by computer program instructions encoded on a computer-readable storage medium in a machine-readable format, or on other media or articles of manufacture. FIG. 12 is a schematic illustrating a conceptual partial view of a computer program product that includes a computer program for executing a computer process on a computing device, arranged according to at least some implementations disclosed herein.

In some implementations, the example computer program product 1200 may include one or more program instructions 1202 that, when executed by one or more processors may provide functionality or portions of the functionality described above with respect to FIGS. 1-11. In some examples, the computer program product 1200 may include a computer-readable medium 1204, such as, but not limited to, a hard disk drive, a Compact Disc (CD), a Digital Video Disk (DVD), a digital tape, memory, etc. In some implementations, the computer program product 1200 may include a computer recordable medium 1206, such as, but not limited to, memory, read/write (R/W) CDs, R/W DVDs, etc.

The one or more program instructions 1202 can be, for example, computer executable and/or logic implemented instructions. In some examples, a computing device is configured to provide various operations, or actions in response to the program instructions 1202 conveyed to the computing device by the computer readable medium 1204 and/or the computer recordable medium 1206. In other examples, the computing device can be an external device in communication with a device coupled to the robotic device.

The computer readable medium 1204 can also be distributed among multiple data storage elements, which could be remotely located from each other. The computing device that executes some or all of the stored instructions could be an external computer, or a mobile computing platform, such as a smartphone, tablet device, personal computer, a robot, or a wearable device, among others. Alternatively, the computing device that executes some or all of the stored instructions could be a remotely located computer system, such as a server. For example, the computer program product 1200 can implement operations discussed in reference to FIGS. 1-11.

X. CONCLUSION

It should be understood that arrangements described herein are for purposes of example only. As such, those skilled in the art will appreciate that other arrangements and other elements (e.g. machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

What is claimed is:

1. A device comprising:
   a first rigid structure;
   a second rigid structure elastically coupled to the first rigid structure by a spring element such that the first rigid structure is moveable in six degrees of freedom relative to the second rigid structure;
   a curved reflector fixed to a surface of the first rigid structure;
   three or more photodetectors each operable to measure an illuminance of light incident on the photodetector, wherein each of the three or more photodetectors is fixed to a surface of the second rigid structure;
   a light emitter operable to project light toward the curved reflector, wherein the curved reflector reflects respective portions of the projected light onto the three or more photodetectors, wherein the light emitter and the three or more photodetectors are fixed with respect to each other, and wherein the first rigid structure is movable in six degrees of freedom with respect to the light emitter and the three or more photodetectors; and at least one processor configured to perform operations comprising:

measuring, by each photodetector of the three or more photodetectors, an illuminance of the respective portion of projected light incident on the photodetector;

after a force is applied against at least one of the first rigid structure or the second rigid structure, determining, based on the measured illuminances, a displacement of the first rigid structure or the second rigid structure in one or more degrees of freedom with respect to a reference position of either the first rigid structure or the second rigid structure respectively;

determining, based on the determined displacement and a relationship between displacement and force, a force vector of the applied force, wherein the force vector comprises a magnitude and a direction of the applied force; and providing an output signal indicative of the force vector.

2. The device of claim 1, wherein the relationship is based on a known characteristic of the spring element.

3. The device of claim 1, wherein the operations further comprise:

providing instructions to control a robotic device based on the determined force vector.

4. The device of claim 1, wherein determining the force vector comprises:

obtaining a transformation matrix configured to convert between displacements and force vectors, wherein the transformation matrix is determined using linear regression based on calibration data including a plurality of displacements and a plurality of force vectors.

5. The device of claim 1, further comprising:

three or more curved reflectors fixed to the surface of the first rigid structure, wherein the operations further comprise:

determining, based on the measured illuminances, the displacement of the first rigid structure in six degrees of freedom with respect to the reference position of the first rigid structure; and providing an output signal indicative of the displacement of the first rigid structure in six degrees of freedom.

6. The device of claim 5, wherein the first rigid structure is displaced from the reference position after the force is applied, wherein the operations further comprise:

determining, based on the displacement of the first rigid structure in six degrees of freedom, a force vector indicative of a magnitude of the force and a direction of the force in six degrees of freedom; and providing an output signal indicative of the force vector in six degrees of freedom.

7. The device of claim 1, wherein the first rigid structure is composed of substantially nonreflective material.

8. The device of claim 1, wherein the second rigid structure is a printed circuit board.

9. The device of claim 1, wherein the three or more photodetectors and the light emitter are substantially coplanar.

10. The device of claim 1, further comprising:

a fourth photodetector operable to measure a calibration illuminance indicative of a luminance of the light emitter, wherein the calibration illuminance is not affected by a position of the first rigid structure relative to the second rigid structure, and wherein measuring the calibration illuminance of the respective portion of projected light incident on the fourth photodetector comprises:

measuring, by the fourth photodetector, the calibration illuminance;

comparing the measured calibration illuminance to a reference illuminance indicative of a past illuminance; and adjusting the determination of the displacement of the first rigid structure or the second rigid structure based on the comparison of the measured calibration illuminance to the reference illuminance and the illuminances measured by the three or more photodetectors.

11. The device of claim 1, wherein the operations further comprise:

adjusting operation of a robotic device based on the output signal.

12. A method comprising:

causing a light emitter to project light toward a curved reflector, wherein the curved reflector is fixed to a surface of a first rigid structure and the light emitter is fixed to a surface of a second rigid structure, and further wherein the first rigid structure is elastically coupled to the second rigid structure by a flexure element such that the first rigid structure is movable in six degrees of freedom relative to the second rigid structure;

measuring, by three or more photodetectors fixed to the surface of the second rigid structure, three or more illuminances of light incident on the respective three or more photodetectors, wherein each illuminance represents an intensity of a portion of the projected light that reflects off the curved reflector and is incident on a respective photodetector;

determining, based on the three or more measured illuminances, a displacement of the first rigid structure or the second rigid structure in one or more degrees of freedom with respect to a reference position of either the first rigid structure or the second rigid structure respectively, wherein the reference position is based on a spatial location of the curved reflector when the flexure is at equilibrium;

determining, based on the determined displacement and a relationship between displacement and force, a force vector of a force applied against at least one of the first rigid structure or the second rigid structure, wherein the force vector comprises a magnitude and a direction of the applied force; and providing an output signal indicative of the force vector.

13. The method of claim 12, wherein determining the displacement comprises:

obtaining calibration data that correlates (i) sets of illuminances and (ii) displacement, wherein the sets of illuminances represent measurements captured when the curved reflector is moved to known displacements relative to the reference position; and determining the displacement based on the three or more illuminances and the calibration data.

14. The method of claim 12, wherein determining the force vector comprises:

obtaining calibration data that correlates (i) displacements and (ii) force vectors, wherein the displacements represent measured displacements when known forces are applied against at least one of the first rigid structure or the second rigid structure;

determining, using linear regression, a transformation matrix based on the calibration data; and determining the force vector based on the displacement vector and the transformation matrix.

15. The method of claim 12, further comprising:
providing instructions to control a robotic device based on the determined force vector.

16. The method of claim 12, further comprising:
measuring, by a fourth photodetector, a calibration illuminance, wherein the calibration illuminance is indicative of a luminance of the light emitter, wherein the calibration illuminance is not affected by a position of the first rigid structure relative to the second rigid structure;

comparing the measured calibration illuminance to a reference illuminance indicative of a past illuminance; and adjusting the determination of the displacement of the first rigid structure based on the comparison of the measured calibration illuminance to the reference illuminance and the illuminances measured by the three or more photodetectors.

17. A robotic system comprising:
a sensor located within the robotic system, the sensor comprising:
   a first rigid structure;
   a second rigid structure elastically coupled to the first rigid structure by a spring element such that the first rigid structure is movable in six degrees of freedom relative to the second rigid structure;
   a plurality of curved reflectors coupled to a surface of the first rigid structure;
   a plurality of optical sensor assemblies coupled to a surface of the second rigid structure, wherein each optical sensor assembly of the plurality of optical sensor assemblies is aligned with one of the plurality of curved reflectors, and further wherein each of the optical sensor assemblies comprises:
      three or more photodetectors each operable to measure an illuminance of light incident on the photodetector; and
      a light emitter operable to project light towards the respective curved reflector aligned with the respective sensor assembly, wherein the curved reflector reflects respective portions of the projected light onto the three or more photodetectors; and at least one processor configured to perform operations comprising:
   measuring, by each optical sensor assembly of the plurality of optical sensor assemblies, an illuminance of the respective portion of projected light incident on the three or more photodetectors of each optical sensor assembly;
   after a force is applied against at least one of the first rigid structure or the second rigid structure, determining, based on an illuminance distribution, a displacement of the first rigid structure or the second rigid structure in one or more degrees of freedom with respect to a reference position of either the first rigid structure or the second rigid structure respectively, wherein the illuminance distribution comprises each of the measured illuminances of each optical sensor assembly;
   determining, based on the determined displacement and a relationship between displacement and force, a force vector of the applied force, wherein the force vector comprises a magnitude and a direction of the applied force; and
   adjusting operation of the robotic system based on the determined force vector.

18. The robotic system of claim 17, wherein the plurality of curved reflectors comprises three curved reflectors spaced out on the surface of the first rigid structure, and further wherein the plurality of optical sensor assemblies comprises three optical sensor assemblies wherein each of the three optical sensor assemblies is aligned with one of the three curved reflectors.

19. The robotic system of claim 17, wherein the reference position of the first rigid structure is based on a reference plane defined by a spatial location of each of the plurality of curved reflectors.

20. The robotic system of claim 17, wherein the at least one processor is configured to further perform operations comprising:
   determining, based on the illuminance distribution, an angular displacement of the first rigid structure or the second rigid structure in one or more degrees of freedom with respect to the reference position of either the first rigid structure or the second rigid structure respectively;
   determining, based on the determined angular displacement, a torque vector of the applied force; and
   adjusting operation of the robotic system based on the determined torque vector.

* * * * *